United States Patent
McConoughey et al.

(10) Patent No.: US 11,458,872 B2
(45) Date of Patent: Oct. 4, 2022

(54) WORK VEHICLE OPERATOR STATION WITH ARM HEIGHT ADJUSTMENT MECHANISM

(71) Applicant: Deere & Company, Moline, IL (US)

(72) Inventors: Gregory O. McConoughey, Le Claire, IA (US); Michael Thompson, Clayton, IN (US); Brian M. Huenink, Cedar Grove, WI (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/130,380

(22) Filed: Dec. 22, 2020

(65) Prior Publication Data

US 2021/0262194 A1 Aug. 26, 2021

Related U.S. Application Data

(60) Provisional application No. 62/979,913, filed on Feb. 21, 2020.

(51) Int. Cl.
*B60N 2/75* (2018.01)
*E02F 9/16* (2006.01)

(52) U.S. Cl.
CPC ............... *B60N 2/77* (2018.02); *E02F 9/166* (2013.01)

(58) Field of Classification Search
CPC .................................. B60N 2/77; A47C 7/541
See application file for complete search history.

(56) References Cited

U.S. PATENT DOCUMENTS 4,881,778 A 11/1989 Stephenson et al.
5,634,537 A 6/1997 Thorn
(Continued)

FOREIGN PATENT DOCUMENTS

DE 102005023890 A1 12/2005
DE 102014209462 A1 11/2015
(Continued)

OTHER PUBLICATIONS

German Search Report issued in application No. DE102021201328.7, dated Jul. 2, 2021, 10 pages.
(Continued)

*Primary Examiner* — David R Dunn
*Assistant Examiner* — Tania Abraham
(74) *Attorney, Agent, or Firm* — Klintworth & Rozenblat IP LLP

(57) ABSTRACT

An operator station is provided for a work vehicle cab. The operator station includes a base frame; an operator chair including a chair frame; and a chair arm. A chair arm adjustment mechanism includes a mounting post and the chair frame; a clamp configured to fit about the mounting post; a tie rod; and a lever. The lever is movable into a first pivotal position to move the tie rod to substantially disengage the clamp surface from the post surface, and the lever is movable into a second pivotal position to move the tie rod to substantially engage the clamp surface on the post surface. When the clamp surface is disengaged, the chair arm body is movable along the post axis, and when the clamp surface is engaged with the post surface, the chair arm body, at least in part, is fixed along the post axis.

19 Claims, 17 Drawing Sheets

(56) References Cited

U.S. PATENT DOCUMENTS

| | | | | |
|---|---|---|---|---|
| 6,851,754 B2* | 2/2005 | Bremner | ................ | B60N 2/773 |
| | | | | 297/411.36 |
| 7,458,439 B2* | 12/2008 | Catton | ................... | B60N 2/767 |
| | | | | 180/334 |
| 8,328,285 B2* | 12/2012 | Hsuan-Chin | ............. | B60N 2/77 |
| | | | | 297/411.36 |
| 8,388,262 B2* | 3/2013 | Klein | ..................... | B60N 2/797 |
| | | | | 404/83 |
| 9,352,673 B2* | 5/2016 | Yasunobe | ............... | B60N 2/753 |
| 9,616,785 B2 | 4/2017 | Marini et al. | | |
| 9,707,865 B1 | 7/2017 | Buerkle | | |
| 2007/0017728 A1* | 1/2007 | Sano | ...................... | B60N 2/773 |
| | | | | 180/334 |
| 2010/0006364 A1 | 1/2010 | Koutsky et al. | | |

FOREIGN PATENT DOCUMENTS

| | | |
|---|---|---|
| DE | 102015106386 A1 | 5/2016 |
| DE | 102017205715 A1 | 11/2017 |
| DE | 102019100826 A1 | 7/2019 |
| DE | 102018212977 A1 | 2/2020 |
| DE | 102017005905 A1 | 5/2021 |
| EP | 0669221 A1 | 8/1995 |
| WO | 2018234480 A1 | 12/2018 |

OTHER PUBLICATIONS

German Search Report issued in counterpart application No. 102021201357 dated Jul. 5, 2021.

German Search Report issued in counterpart application No. 102021201542 dated Jul. 15, 2021.

\* cited by examiner

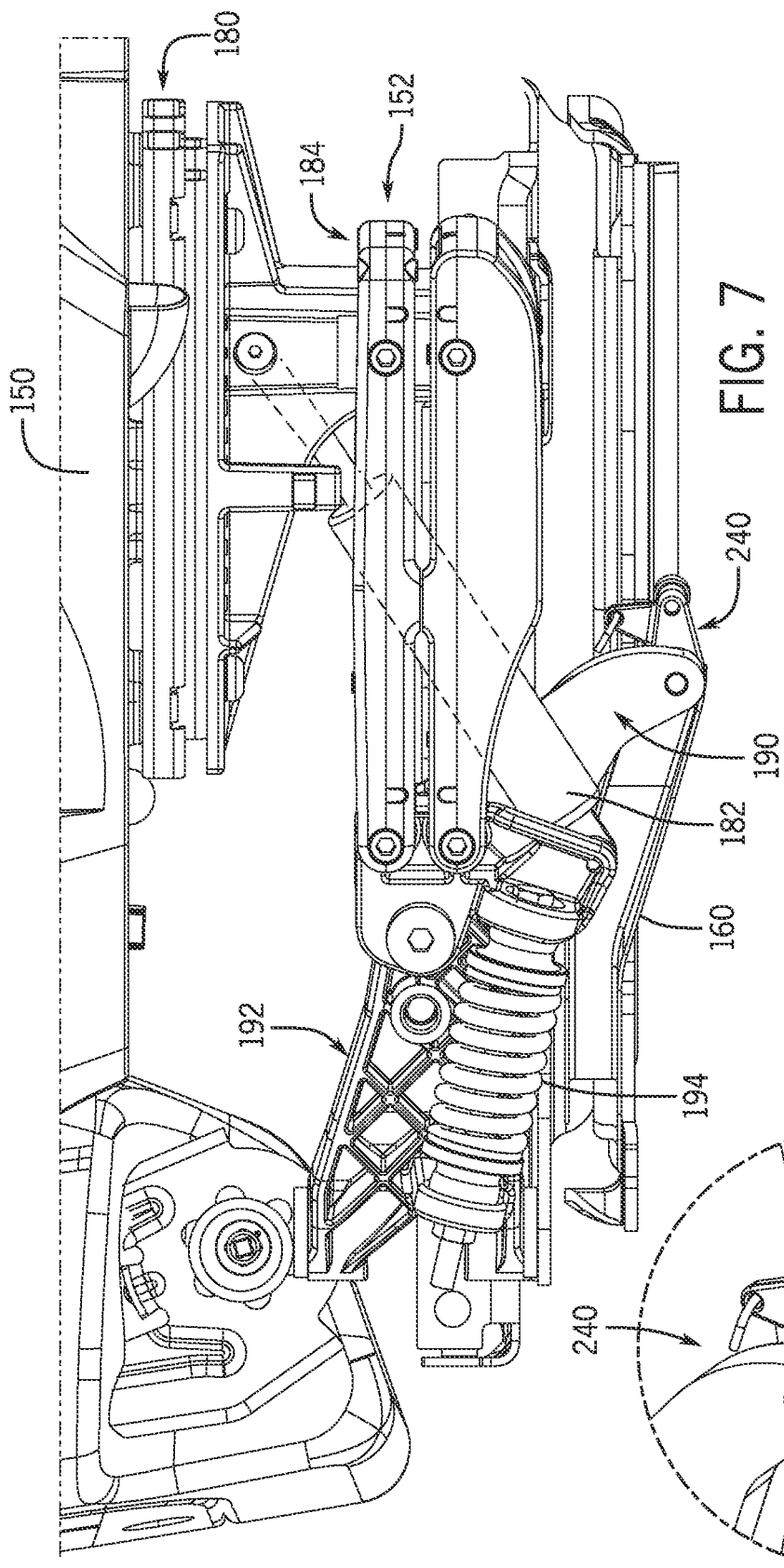
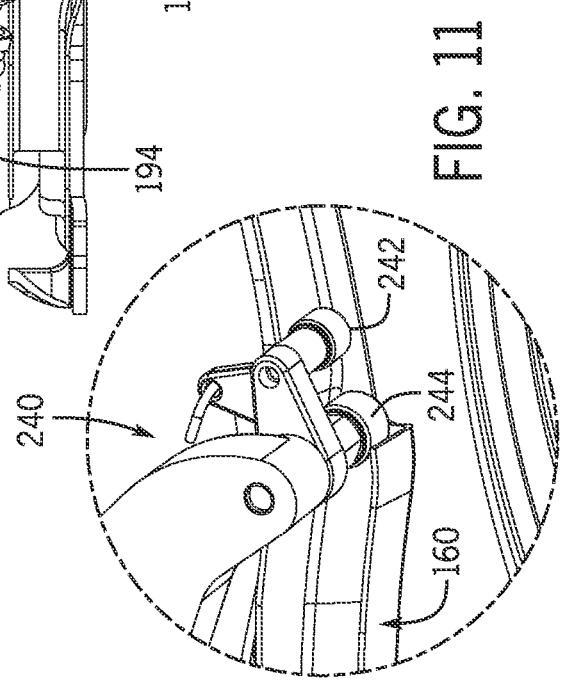
FIG. 7
FIG. 11

WORK VEHICLE OPERATOR STATION WITH ARM HEIGHT ADJUSTMENT MECHANISM

CROSS-REFERENCE TO RELATED APPLICATION(S)

This application is a nonprovisional application of and claims priority to U.S. Provisional Application No. 62/979,913, filed Feb. 21, 2020. U.S. Provisional Application No. 62/979,913 is hereby incorporated by reference.

STATEMENT OF FEDERALLY SPONSORED RESEARCH OR DEVELOPMENT

Not applicable.

FIELD OF THE DISCLOSURE

This disclosure relates to a work vehicle, and more particularly, to an operator station for a work vehicle.

BACKGROUND OF THE DISCLOSURE

A work vehicle, such as a tractor, performs numerous work functions, including the maneuvering of the vehicle and manipulation of associated work implements. Such functions may require a large number of controls and interfaces arranged within an operator station of the work vehicle cab. An operator chair of the operator station must be positioned within the work vehicle cab to comfortably support the operator as well as provide ready access to the controls and interfaces. These considerations may result in a crowded operator cab with potential spatial conflicts or interferences between the operator chair and controls or interfaces.

SUMMARY OF THE DISCLOSURE

In one example, an operator station is provided for a cab of a work vehicle. The operator station includes a base frame configured to be secured to a floor of the cab; an operator chair including a chair frame mounted on the base frame; and a chair arm positioned on a first side of the chair frame. The chair arm includes a chair arm body; and a chair arm adjustment mechanism. The chair arm adjustment mechanism includes a mounting post coupled to the chair arm and the chair frame, extending along an upright post axis, and having an exterior post surface; a clamp configured to fit about the mounting post so that a clamp surface of the clamp is engageable with the post surface of the mounting post; a tie rod coupled to the clamp; and a lever pivotally coupled to the tie rod to axially reposition the tie rod, one or more of the lever and the tie rod having an eccentric surface configured to apply a cam force between the lever and the tie rod. The lever is movable into a first pivotal position to move the tie rod into a first axial position along its long axis and substantially disengage the clamp surface from the post surface, and the lever is movable into a second pivotal position to move the tie rod into a second axial position along its long axis and substantially engage the clamp surface on the post surface. When the clamp surface is disengaged from the post surface, the chair arm body is movable along the post axis, and when the clamp surface is engaged with the post surface, the chair arm body, at least in part, is fixed along the post axis.

In a further example, an operator system is provided in a cab of a work vehicle. The operator system includes at least one work vehicle console; and an operator station for the cab of the work vehicle. The operator station includes a base frame configured to be secured to a floor of the cab; an operator chair including a chair frame mounted on the base frame; and a chair arm positioned on a first side of the chair frame. The chair arm includes a chair arm body and a chair arm adjustment mechanism. The chair arm adjustment mechanism includes a mounting post coupled to the chair arm and the chair frame, extending along an upright post axis, and having an exterior post surface; a clamp configured to fit about the mounting post so that a clamp surface of the clamp is engageable with the post surface of the mounting post; a tie rod coupled to the clamp; and a lever pivotally coupled to the tie rod to axially reposition the tie rod, one or more of the lever and the tie rod having an eccentric surface configured to apply a cam force between the lever and the tie rod. The lever is movable into a first pivotal position to move the tie rod into a first axial position along its long axis and substantially disengage the clamp surface from the post surface, and the lever is movable into a second pivotal position to move the tie rod into a second axial position along its long axis and substantially engage the clamp surface on the post surface. When the clamp surface is disengaged from the post surface, the chair arm body is movable along the post axis and relative to the at least one work vehicle console, and when the clamp surface is engaged with the post surface, the chair arm body, at least in part, is fixed along the post axis.

BRIEF DESCRIPTION OF THE DRAWINGS

FIG. 7 is a first side view of a control arm adjustment mechanism of the operator station of FIG. 3;

FIG. 11 is a partial detail view of a section of FIG. 4;

Like reference symbols in the various drawings indicate like elements.

DETAILED DESCRIPTION

Figure 1:
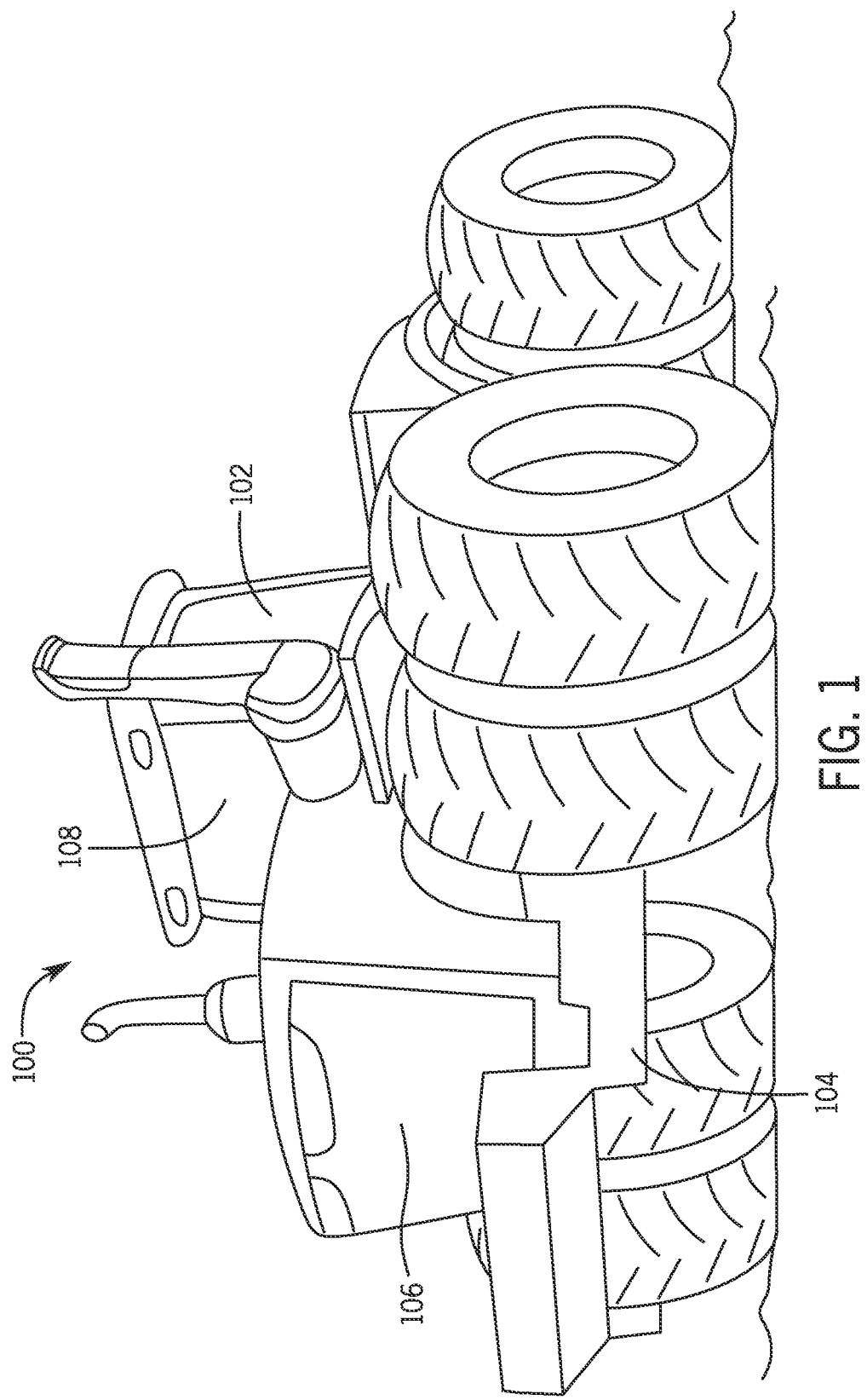
FIG. 1 is a front perspective view of an example work vehicle in the form of a tractor in which the disclosed operator station may be used.

The following describes one or more example embodiments of the disclosed operator station for a work vehicle, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a direction that is generally parallel to an axis of rotation, axis of symmetry, or centerline of a component or components. For example, in a cylinder or disc with a centerline and opposite, generally circular ends or faces, the "axial" direction may refer to the direction that generally extends in parallel to the centerline between the opposite ends or faces. In certain instances, the term "axial" may be utilized with respect to components that are not cylindrical (or otherwise radially symmetric). Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

As used below, unless otherwise noted, the term "longitudinal" may encompass an orientation parallel to an axis extending between the front of the work vehicle and the rear of the work vehicle (e.g., forward and aft or forward and reverse). Similarly, the term "lateral" may encompass an orientation parallel to an axis extending from one side of the work vehicle to the other, perpendicular to the longitudinal orientation. The term "horizontal" plane may be considered to include a plane that includes a longitudinal axis and a lateral axis, which may also be referred to as a "lateral" plane in the discussion below. The term "vertical" may encompass an orientation parallel to an axis extending between the top and bottom of the work vehicle, perpendicular to the longitudinal and lateral orientations. As used below, adjustment within a vertical plane or in a vertical orientation refers to a height adjustment in which a component is raised or lowered perpendicularly relative to a longitudinal-lateral (or horizontal) (or merely, "lateral") plane. In other words, the terms "horizontal" and "vertical" are not necessarily absolute orientations (e.g., relative to "seal level"). The terms "inboard" (or "inward") and "outboard" (or "outward") may refer to relative lateral directions with respect to a central longitudinal axis of the work vehicle. For example, "inboard" refers to a relative direction towards the center of the work vehicle, and "outboard" refers to a relative direction away from the center of the work vehicle.

The terms "front" (or "forward") and "rear" are relative to one another and refer to the primary propulsion direction of the work vehicle, such that a "front" direction is oriented towards a forward propulsion direction and the "rear" direction is oriented toward a reverse propulsion direction, opposite to the forward direction. Similarly, the terms "top" and "bottom," and "up" and "down," are relative to one another with respect to vertical orientations. Finally, the terms "clockwise" and "counterclockwise" (or "clock directions") are referenced below as pivot directions with respect to a top view relative to a front direction. However, it should be noted that the references to relative terms discussed below are merely examples and that the direction or orientations may be reversed within the context of the present disclosure.

The following describes an example operator system formed by an operator station surrounded by one or more consoles. The operator station includes an operator chair with arms that are pivotable along a lateral axis, horizontally pivotable within a lateral plane, and upwardly and downwardly repositionable within a work vehicle cab to enhance operator comfort and to avoid interference between the operator station and the consoles. For example, each of the chair arms may be laterally pivotably away from the steering wheel as the chair swivels the pivoting arm towards the steering wheel. Further, one or both arms may be pivoted upwards when swiveling the chair towards a console to avoid contact, and/or one or both arms may be repositionable upwards and downwards to enhance operator comfort. Such cooperating and/or independent adjustment mechanisms may include a number of chair struts and cams mounted to the chair frame and a number of cam tracks mounted to the base frame, as will be described below. As such, the disclosed embodiments provide a work vehicle operator station with a swivel arm raise avoidance system, a swivel arm swing avoidance system, and an arm height adjustment mechanism, which may be used individually or in combination. It will be understood that the implementation of the operator system within a tractor as the work vehicle is presented as an example only. Other work vehicles, such as those used in the construction industry or other agricultural vehicles, may benefit from the disclosed operator station as well.

FIG. 1 is a front perspective view of an example work vehicle 100 in the form of a tractor in which the disclosed operator system, operator station, and operator chair may be used. Generally, the work vehicle 100 may be considered to have a cab 102 supported by a frame or chassis 104. The work vehicle 100 may additionally include a powertrain 106 with one or more components to generate, store, and transfer energy to propel the work vehicle 100 and perform one or more work tasks. Components of the powertrain 106 may include, as examples, an engine, motor, battery, transmission, axles, wheels, controllers, actuators, and the like. Although not shown, the work vehicle 100 may further include one or more implements to perform the work tasks. The work vehicle 100 may have any suitable components necessary or desired for operation. As discussed in greater detail below, an operator system 108 may be housed within the cab 102 to control various aspects the work vehicle 100, including maneuvering the work vehicle 100 and manipulating the implements of the work vehicle 100.

Figure 2:
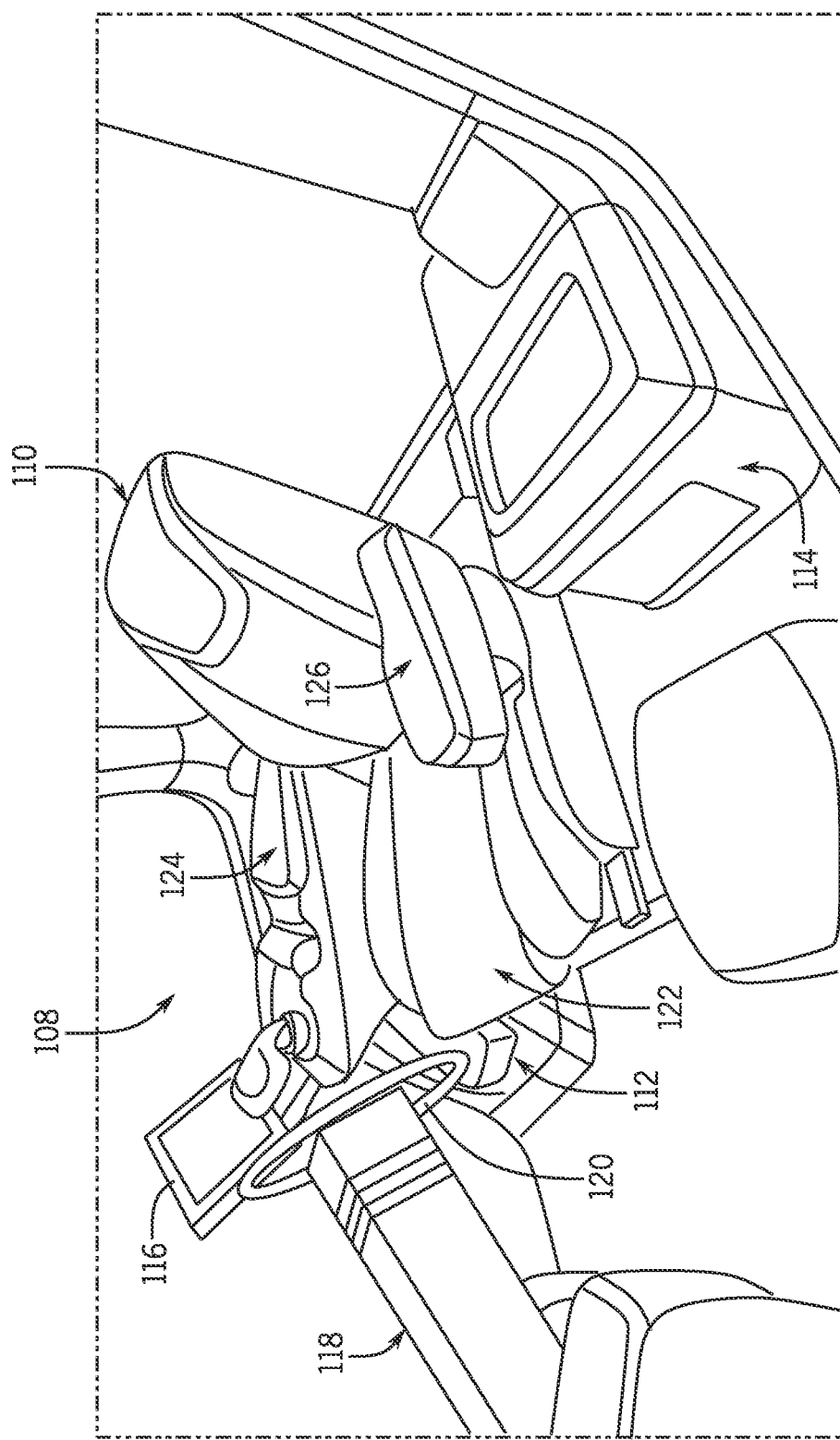
FIG. 2 is a top front perspective view of a cab interior of the work vehicle of FIG. 1.

FIG. 2 is a top front perspective view of the interior of the cab 102 of the work vehicle 100 of FIG. 1 that houses the operator system 108. In one example, the operator system 108 formed by an operator station 110 mounted on a floor of the cab 102, a first and second side consoles 112, 114 on either side of the operator station 110, and a forward console 118 in front of the operator station 110. Generally, the first and second side consoles 112, 114 support one or more operator interfaces, including a monitor 116; and the forward console 118 supports one or more operator interfaces, including a steering wheel 120.

The operator station 110 may be considered to include an operator chair 122 to support an operator, a first arm 124 on a first (or right) side of the operator chair 122, and a second arm 126 on the second (or left) side of the operator chair 122. In one example, the first arm 124 may be considered a control arm 124 since one or more operator interfaces (e.g., "controls") may be integrated into a top surface, and the second arm 126 may be considered an armrest 126 without controls. However, it should be noted that the arms 124, 126 may have various configurations. For example, the positions of the control arm 124 and the armrest 126 may be swapped; the first arm 124 may be implemented without controls (e.g., both arms 124, 126 being "armrests"); and/or the second arm 126 may be implemented with a number of controls (e.g., both arms 124, 126 being "control arms").

Typically, the operator chair 122 may be pivoted or swiveled in clockwise and counterclockwise directions for comfort and/or to improve sightlines or fields-of-view within the cab 102. As described in greater detail below, operator station 110 may include a number of adjustment arrangements to reposition or move the control arm 124 and/or armrest 126 during these movements in order to avoid any conflict or interference between the control arm 124 and/or armrest 126 and the consoles 112, 114, 118.

Figure 3:
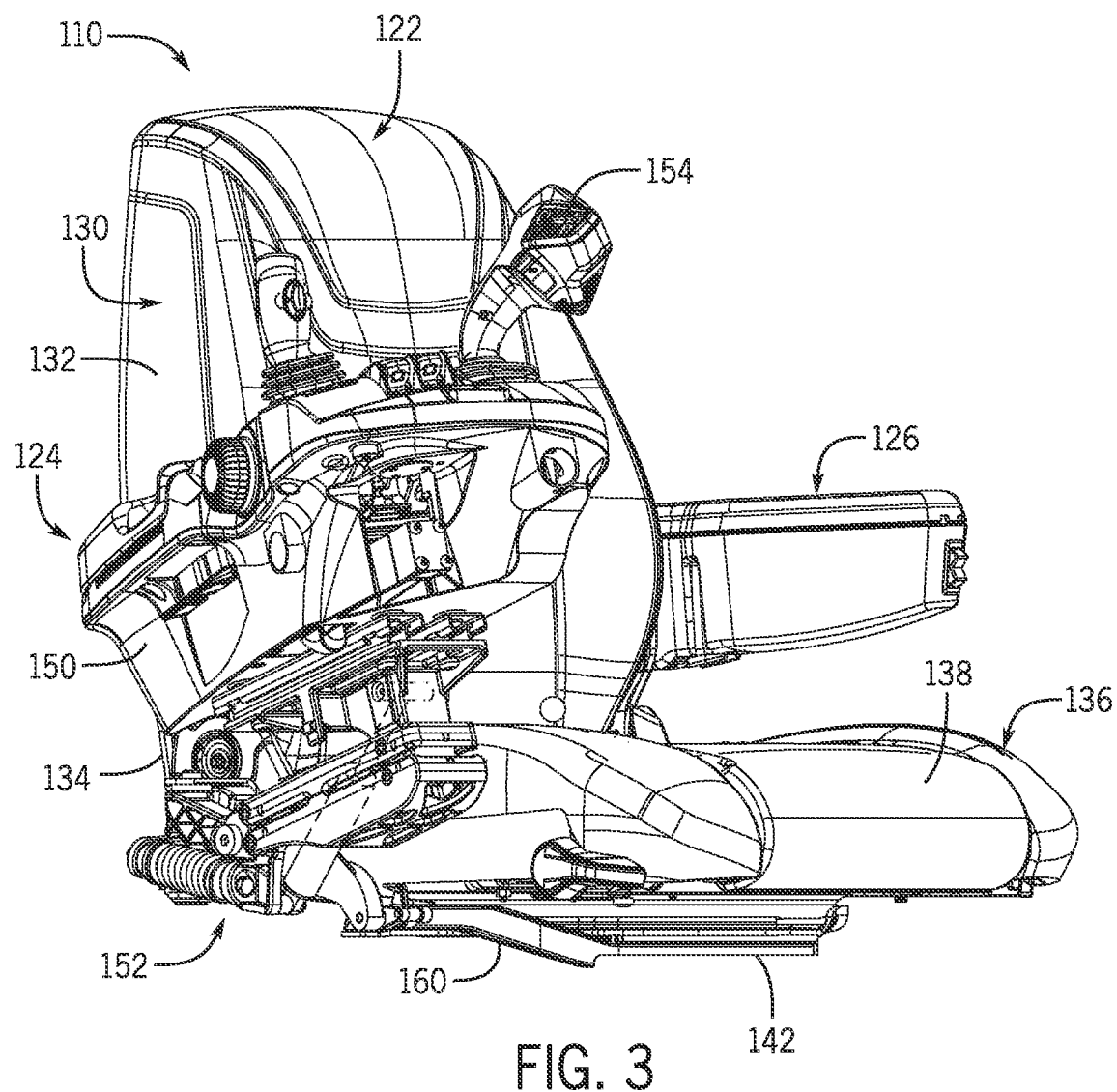
FIG. 3 is a front first side view of an operator station from the cab interior of the work vehicle of FIG. 2.

The operator station 110 is depicted in greater detail in the isometric view of FIG. 3. As introduced above, the operator station 110 generally includes the operator chair 122 formed by a backrest 130 and seat 136, each with a respective cushion 132, 138 mounted on an underlying chair frame 134. The chair frame 134 of the chair 122 is mounted on a base frame 142 secured or fixed to the cab floor. As described in greater detail below, the operator chair 122 is configured to swivel in a horizontal or lateral plane relative to the base frame 142 in first and second clock directions (e.g., clockwise and counterclockwise directions). Additional details about the operator station 110 are depicted in greater detail in the views of FIGS. 4 and 5, in which the chair cushion 138 has been removed for clarity. For example, the top view of FIG. 5 depicts the seat frame 140 coupled to the base frame 142 on a frame bearing 144 that enables clockwise and counterclockwise movements of the operator chair 122 relative to the base frame 142 about a center swivel axis.

Figure 4:
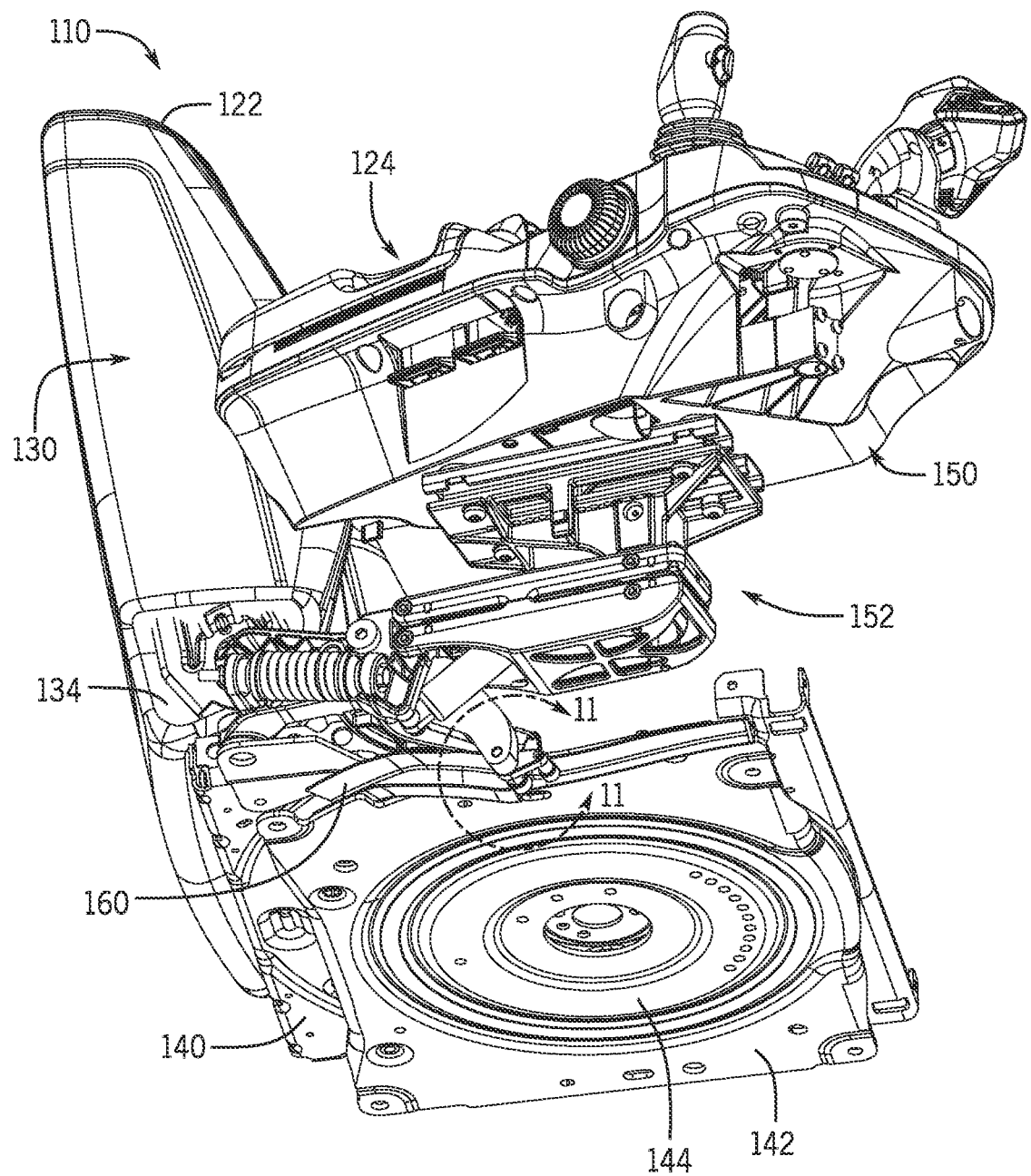
FIG. 4 is a partial bottom first side view of the operator station of FIG. 3.
Figure 5:
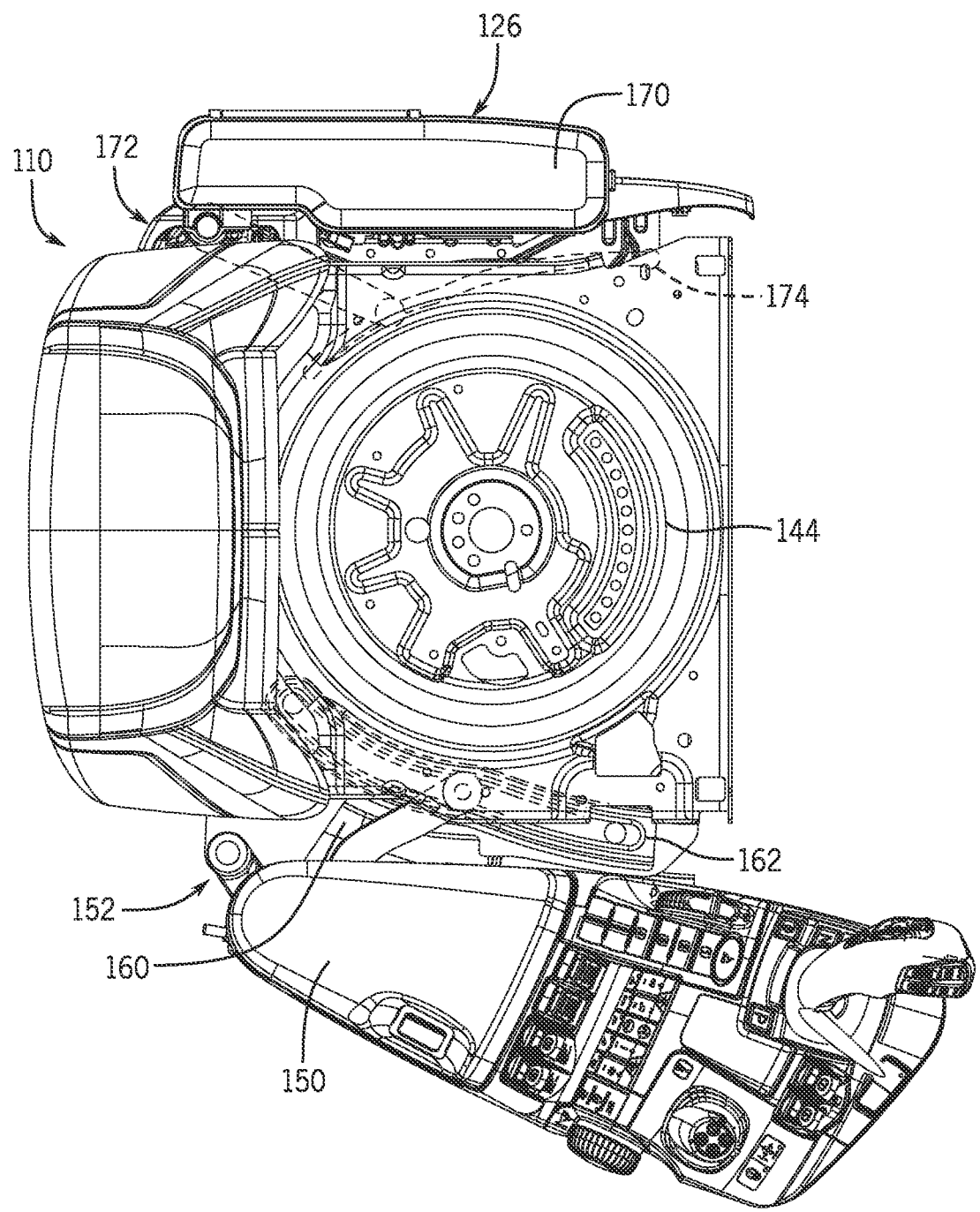
FIG. 5 is a partial top view of the operator station of FIG. 3.

Referring to FIGS. 3-5, in one example, the control arm 124 may be considered to include a control arm body 150 at least partially mounted to the operator chair 122 with a control arm adjustment mechanism 152. Generally, the control arm body 150 may provide a support surface for the right arm of the operator and further support the controls 154 introduced above for access by the operator. The control arm adjustment mechanism 152 operates to reposition the control arm body 150 in a number of ways, including pivoting the forward end of the control arm body 150 in a "vertical" direction (e.g., perpendicular to a lateral plane) relative to the other portions of the operator chair 122; pivoting the forward end of the control arm body 150 in a "horizontal" or lateral direction relative to the other portions of the operator chair 122; and/or lifting and/or lowering the entire control arm body 150 relative to the other portions of the operator chair 122.

The armrest 126 may be considered to include an armrest body 170 at least partially mounted to the operator chair 122 with an armrest adjustment mechanism 172. The armrest adjustment mechanism 172 operates to reposition the armrest body 170 in a number of ways, including pivoting the forward end of the armrest body 170 in a horizontal or lateral direction relative to the other portions of the operator chair 122; and lifting and/or lowering the entire armrest body 170 relative to the other portions of the operator chair 122.

The base frame 142 includes a number of elements that cooperate with the control arm adjustment mechanism 152 and the armrest adjustment mechanism 172 to reposition the control arm 124 and the armrest 126. In particular, a control arm vertical track 160 is part of the base frame 142 and cooperates with the control arm adjustment mechanism 152 to pivot the forward end of the control arm body 150 in a vertical direction relative to the other portions of the operator chair 122. A control arm horizontal track 162 is part of the base frame 142 and cooperates with the control arm adjustment mechanism 152 to pivot the forward end of the control arm body 150 in a horizontal direction relative to the other portions of the operator chair 122. Further, an armrest horizontal track 174 is part of the base frame 142 and cooperates with the control arm adjustment mechanism 152 to pivot the forward end of the armrest body 170 in a horizontal direction relative to the other portions of the operator chair 122. Additional information will be provided below regarding adjustments of the control arm 124 and the armrest 126, including the cooperating or co-movements of the control arm 124 and armrest 126.

Figure 6A:
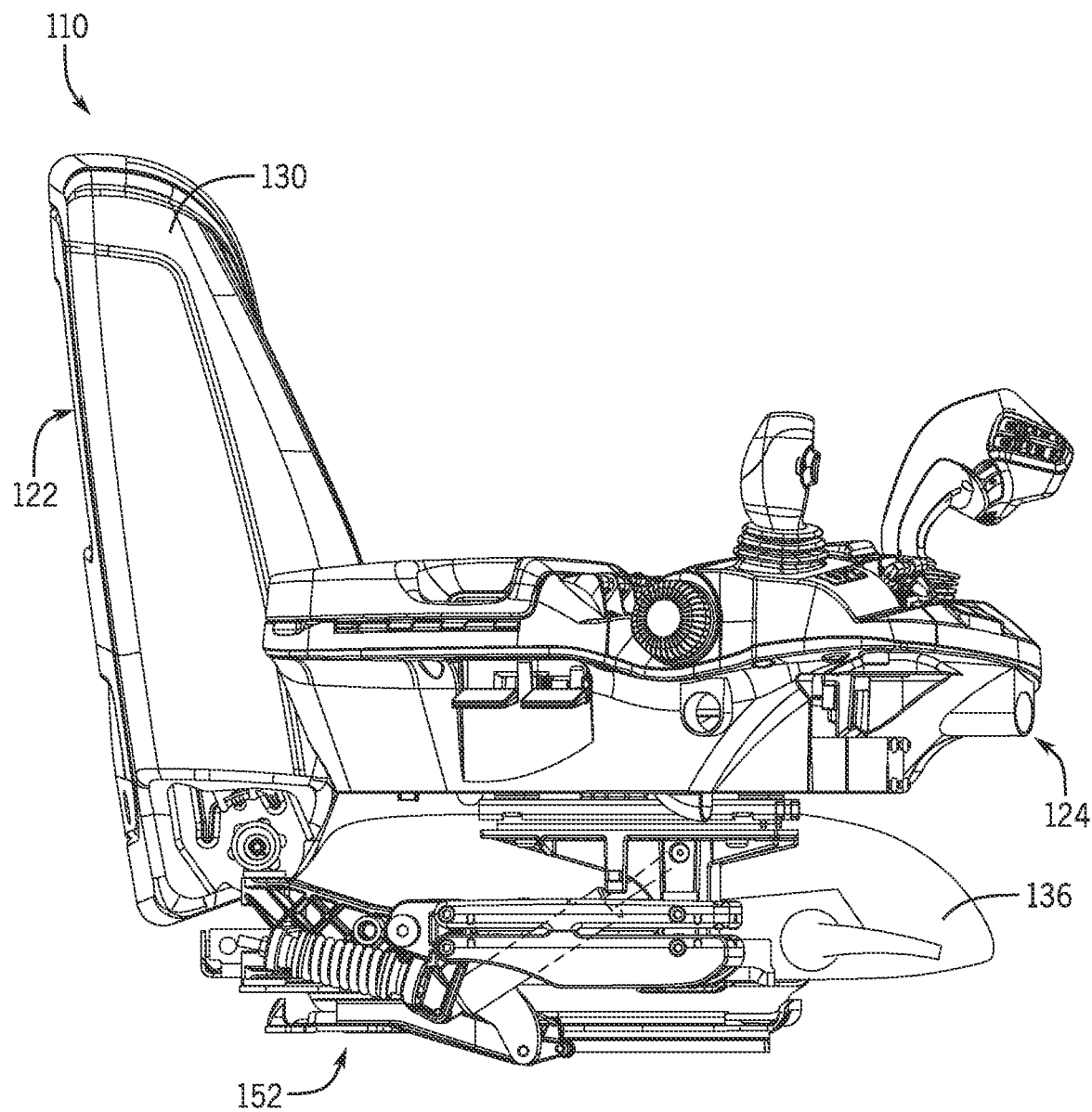
FIG. 6A is a first side view of the operator station of FIG. 3 with a control arm in a low position.
Figure 6B:
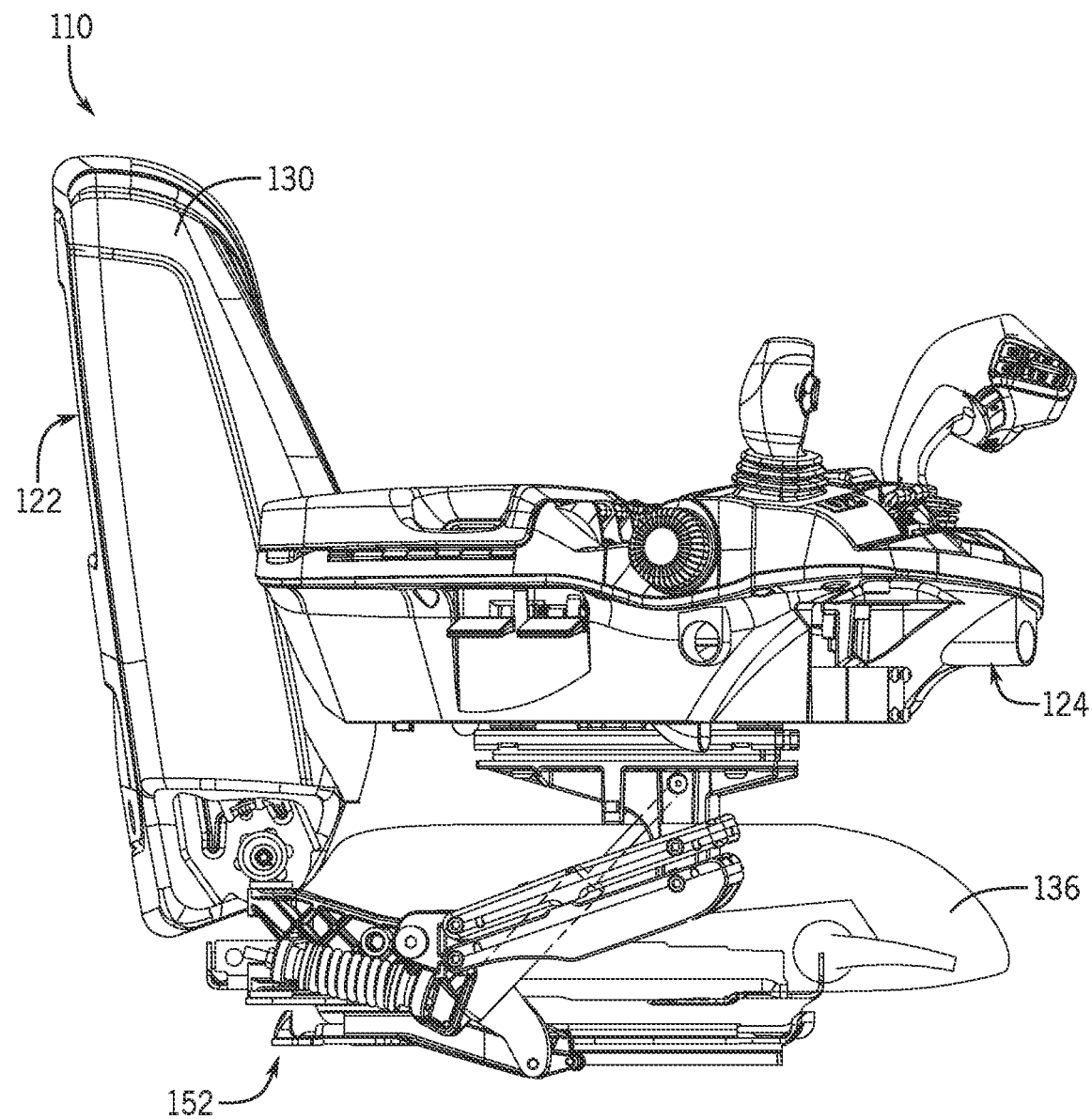
FIG. 6B is another first side view of the operator station of FIG. 3 with the control arm in a high position.

Reference is now made to FIGS. 6A and 6B, which are first side views of the operator station 110 from the side of the control arm 124. As introduced above, the control arm adjustment mechanism 152 enables adjustment of the control arm 124 (particularly the control arm body 150) in the form of a non-pivoting lifting and lowering movements within in a vertical plane. For example, the view of FIG. 6A depicts the control arm 124 in a relatively low position. In contrast, the view of FIG. 6B depicts the control arm 124 in a relatively high position in which the control arm body 150 has been moved vertically upwards relative to the base frame 142 and the other portions of the operator chair 122. As such, the operator may select a more comfortable or efficient control arm position with which to operate the work vehicle 100. Additional details regarding the control arm adjustment mechanism 152 will be now be provided, particularly with respect to the vertical and horizontal pivoting functions.

Figure 8:
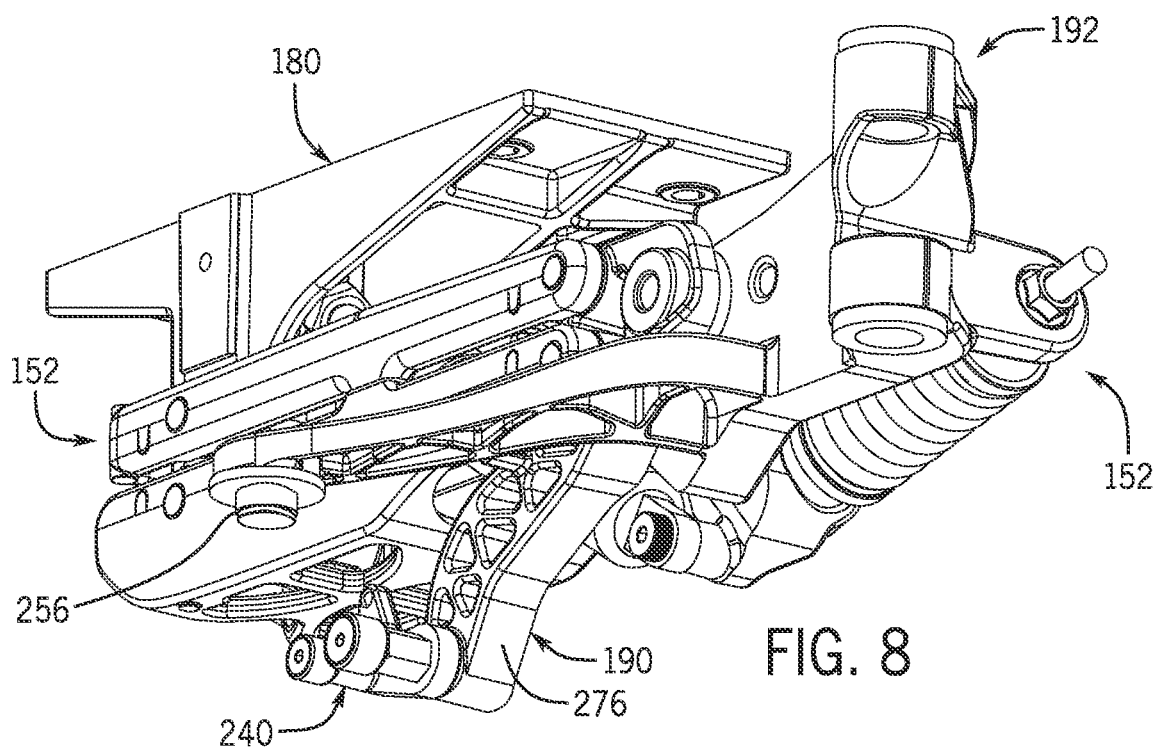
FIG. 8 is a second side perspective view of the control arm adjustment mechanism of the operator station of FIG. 3.
Figure 10:
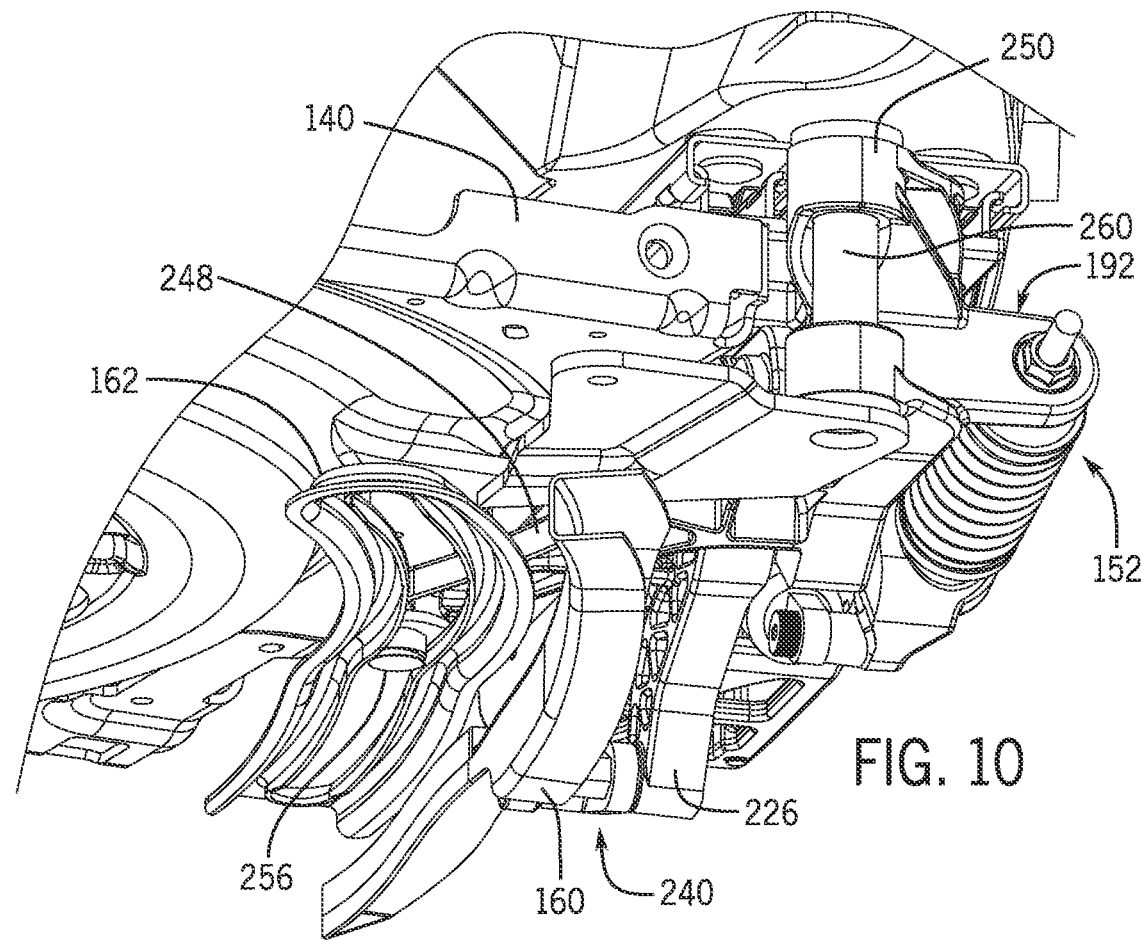
FIG. 10 is a rear second side view of the control arm adjustment mechanism of the operator station of FIG. 3.
Figure 9:
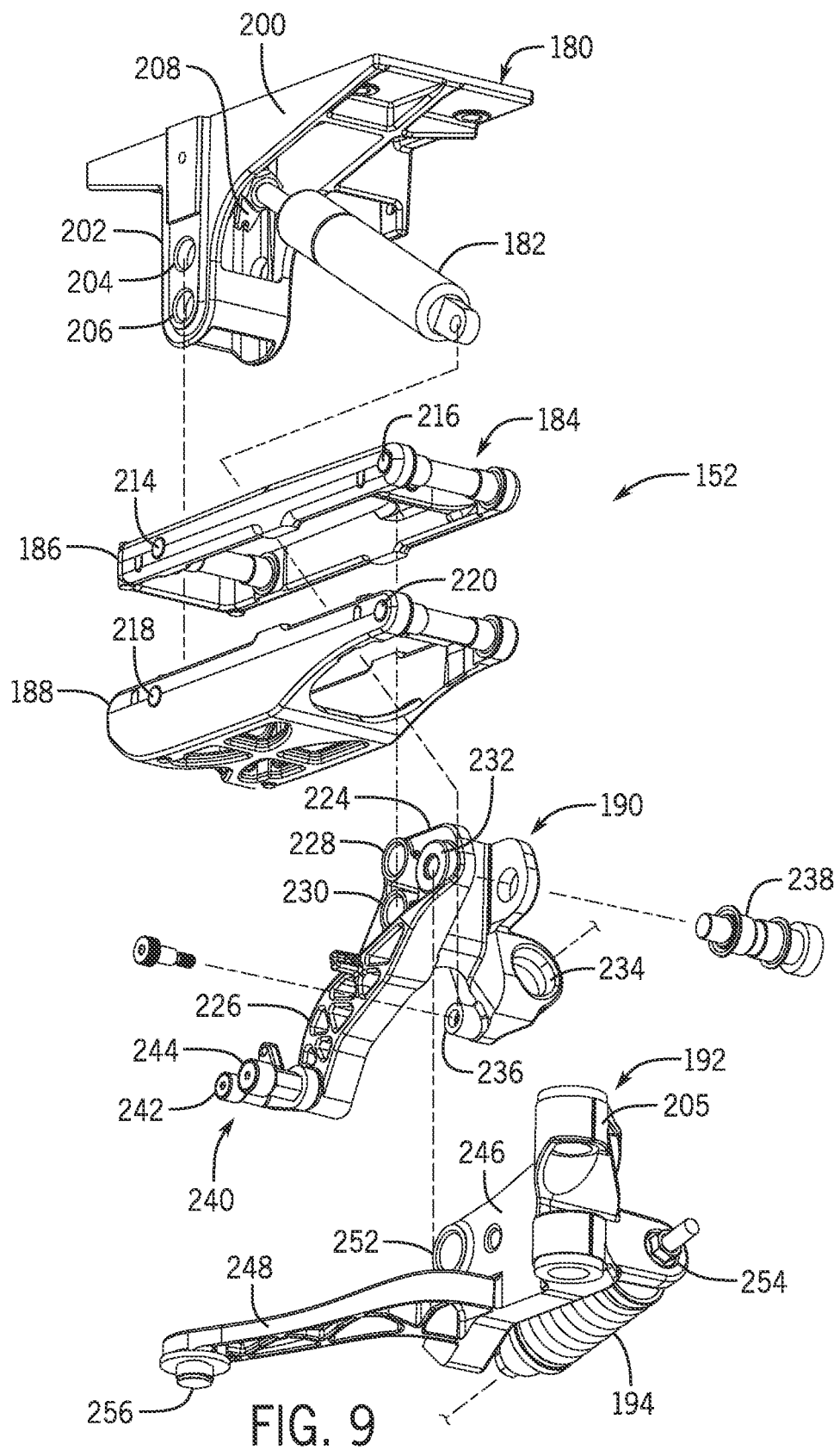
FIG. 9 is an exploded view of the control arm adjustment mechanism of the operator station of FIG. 3.

FIGS. 7-10 are more detailed views of the control arm adjustment mechanism 152. In particular, FIG. 7 is a first side view of the control arm adjustment mechanism 152 mounted to the underside of the control arm body 150; FIG. 8 is a rear second side view of the control arm adjustment mechanism 152 removed from the operator chair 122; FIG. 9 is an exploded view of the control arm adjustment mechanism 152 from a similar perspective as FIG. 8; and FIG. 10 is a rear second side view of the control arm adjustment mechanism 152 mounted to the underside of the control arm 124 and also interacting with aspects of the base frame 142.

As most clearly depicted in the exploded view of FIG. 9, the control arm adjustment mechanism 152 may be considered to include, generally from top to bottom, an adjustment bracket 180; a support piston 182; a four-bar linkage 184 with top and bottom parts 186, 188; a control arm vertical pivot adjustment member 190; a control arm horizontal pivot adjustment member 192; and a spring 194.

In this example, the adjustment bracket 180 is generally formed by bracket base 200 with a horizontal surface configured be to attached to the underside of the control arm body 150. The adjustment bracket 180 further includes a flange portion 202 extending downward, underneath the bracket base 200 with a number of mounting elements 204, 206, 208. The first and second adjustment bracket mounting elements 204, 206 are coupled to the four-bar linkage 184, discussed below. Further, the third adjustment bracket mounting element 208 is configured to receive a first (or piston) end of the support piston 182 on the underside of the bracket base 200 proximate to the flange portion 202, while a second (or cylinder) end of the support piston 182 may be mounted to the control arm vertical pivot adjustment member 190, discussed below.

As noted above, the four-bar linkage 184 includes top and bottom parts 186, 188, each with forward and rearward mounting elements 214, 216, 217, 220. The forward mounting elements 214, 218 of the top and bottom parts 186, 188 are secured to respective mounting elements 204, 206 of the flange portions 202 of the adjustment bracket 180. The rearward mounting elements 216, 220 may be secured to the control arm vertical pivot adjustment member 190, discussed below.

The control arm vertical pivot adjustment member 190 is generally formed by a base 224 and a strut 226 extending downward and forward from the base 224. The control arm vertical pivot adjustment member base 224 includes a number of mounting elements 228, 230, 232, 234, 236, including a first and second mounting elements 228, 230 that may be respectively coupled to the rearward mounting elements 216, 220 of the top and bottom parts 186, 188 of the four-bar linkage 184; a third mounting element 232 that couples the control arm vertical pivot adjustment member 190 to the control arm horizontal pivot adjustment member 192 with a bearing axle 238; a fourth mounting element 234 that receives a forward end of the spring 194; and a fifth mounting element 236 that is coupled to the second end of the support piston 182 with a fastener. The control arm vertical pivot adjustment member 190 further includes a control arm vertical pivot adjustment cam 240 mounted on a distal end of the strut 226. The control arm vertical pivot adjustment cam 240 includes first and second spring loaded cam elements 242, 244 that, as described below, engage the control arm vertical track 160. Briefly, as depicted in FIG. 11, the first and second spring loaded cam elements 242, 244 respectively engage upper and lower rails of the control arm vertical track 160 as the cam 240 travels along the track 160, as discussed in greater detail below. In some embodiments, the control arm vertical track 160 may be horizontally or laterally curved to accommodate movement of the vertical pivot adjustment cam 240 as the chair 122 swivels in the clockwise and counterclockwise directions.

The control arm horizontal pivot adjustment member 192 is generally formed by a base 246 and a strut 248 extending inwardly from the side of the base 246. The base 246 of the control arm horizontal pivot adjustment member 192 also includes a number of mounting elements 250, 252, 254, including a first mounting element 250 in the form of a cylindrical shaft mounting element that receives a control arm mounting post 260 having an upright post axis, a second mounting element 252 that enables the control arm horizontal pivot adjustment member 192 to be coupled to the mounting element 232 of the control arm vertical pivot adjustment member 190 via the bearing axle 238; and a third mounting element 254 that secures one of the spring 194. The control arm horizontal pivot adjustment member 192 further includes a control arm horizontal pivot adjustment cam 256 at the distal end of the strut 248 that, as described below, engages the control arm horizontal track 162. In one example, the bearing axle 238 may provide a lateral pivot axis (e.g., axis 140d, discussed below) that enables the control arm vertical pivot adjustment member 192 to be pivoted upwards and downwards relative to the control arm horizontal pivot adjustment member 192.

As best shown by FIG. 10, the cylindrical shaft mounting element 250 of the control arm horizontal pivot adjustment member 192 couples the control arm adjustment mechanism 152 to the seat frame 140 via a control arm mounting post 260. As a result of this arrangement, the control arm 124 may horizontally pivot about the control arm mounting post 260 in a lateral plane relative to the seat frame 140, as described in greater detail below.

Referring briefly again to FIGS. 6A and 6B, in addition to FIGS. 7-10, the control arm adjustment mechanism 192 additionally enables the vertical lifting and lowering movement of the control arm body 150. As shown by a comparison of FIGS. 6A and 6B, the top and bottom parts 186, 188 of the four-bar linkages 184 may pivot at the rearward mounting elements 216, 220 relatives to the control arm vertical pivot adjustment member 190, thereby lifting the forward end of the four-bar linkage 184. Due to the arrangement of the four-bar linkage 184, the forward end of the four-bar linkage 184 raises adjustment bracket 180 and attached control arm body 150. The support piston 182 and/or spring 194 may be provided to support, stabilize, and/or facilitate either the upward movement of the control arm body 150 depicted from FIG. 6A to FIG. 6B or the downward movement of the control arm body 150 depicted from FIG. 6B to FIG. 6A.

Figure 12:
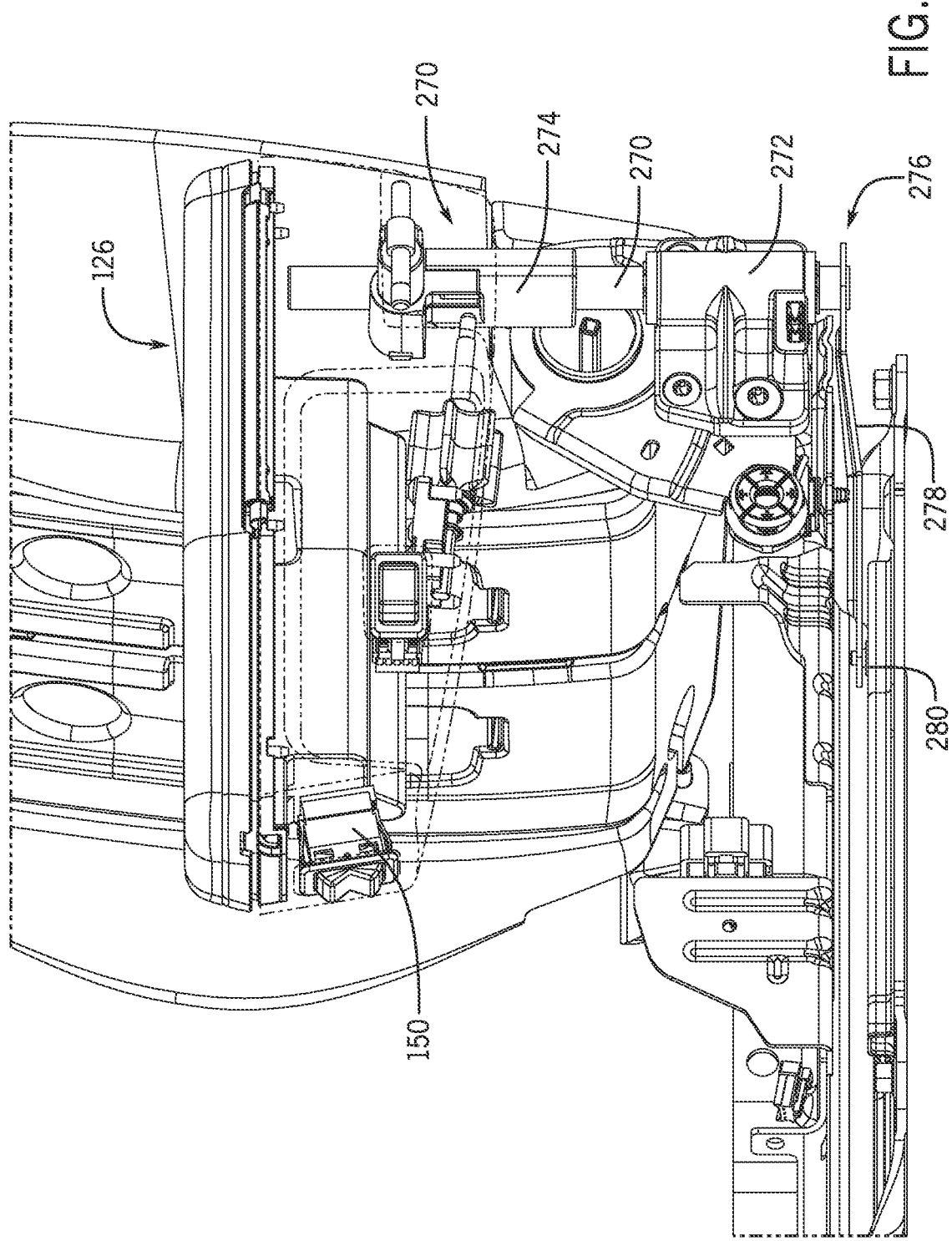
FIG. 12 is a second side view of the operator station of FIG. 3.

The view of FIG. 12 is an isometric view of the armrest 126, particularly the relationship between the armrest 126, the seat frame 140, and the base frame 142. As shown, the armrest body 170 is generally mounted to an armrest mounting post 270 (with an upright post axis generally substantially perpendicular to the chair seat 136), which in turn is mounted to the seat frame 140 with an armrest frame bracket 272. In particular, the armrest body 170 is positioned on a top end of the armrest mounting post 270 via a body mounting element 274. As discussed in greater detail below, the armrest body 170 may be vertically lifted and lowered along the armrest mounting post 270, and horizontally pivoted in a lateral plane about the axis of the armrest mounting post 270.

As also shown in FIG. 12, an armrest horizontal pivot adjustment apparatus 276 is mounted on a lower end of the mounting post 270. The armrest horizontal pivot adjustment apparatus 276 is formed by a coupling strut 278 and an armrest horizontal pivot adjustment cam 280. A first end of the armrest horizontal pivot adjustment apparatus coupling strut 278 is secured to lower end of the armrest mounting post 270. Moreover, the armrest horizontal pivot adjustment cam 280 is mounted to the underside of a second end of the armrest horizontal pivot adjustment apparatus coupling strut 278. As shown, the armrest horizontal pivot adjustment cam 280 is engaged with the armrest horizontal track 174 of the base frame 142, as discussed in greater detail below.

Figures 13A, 13B:
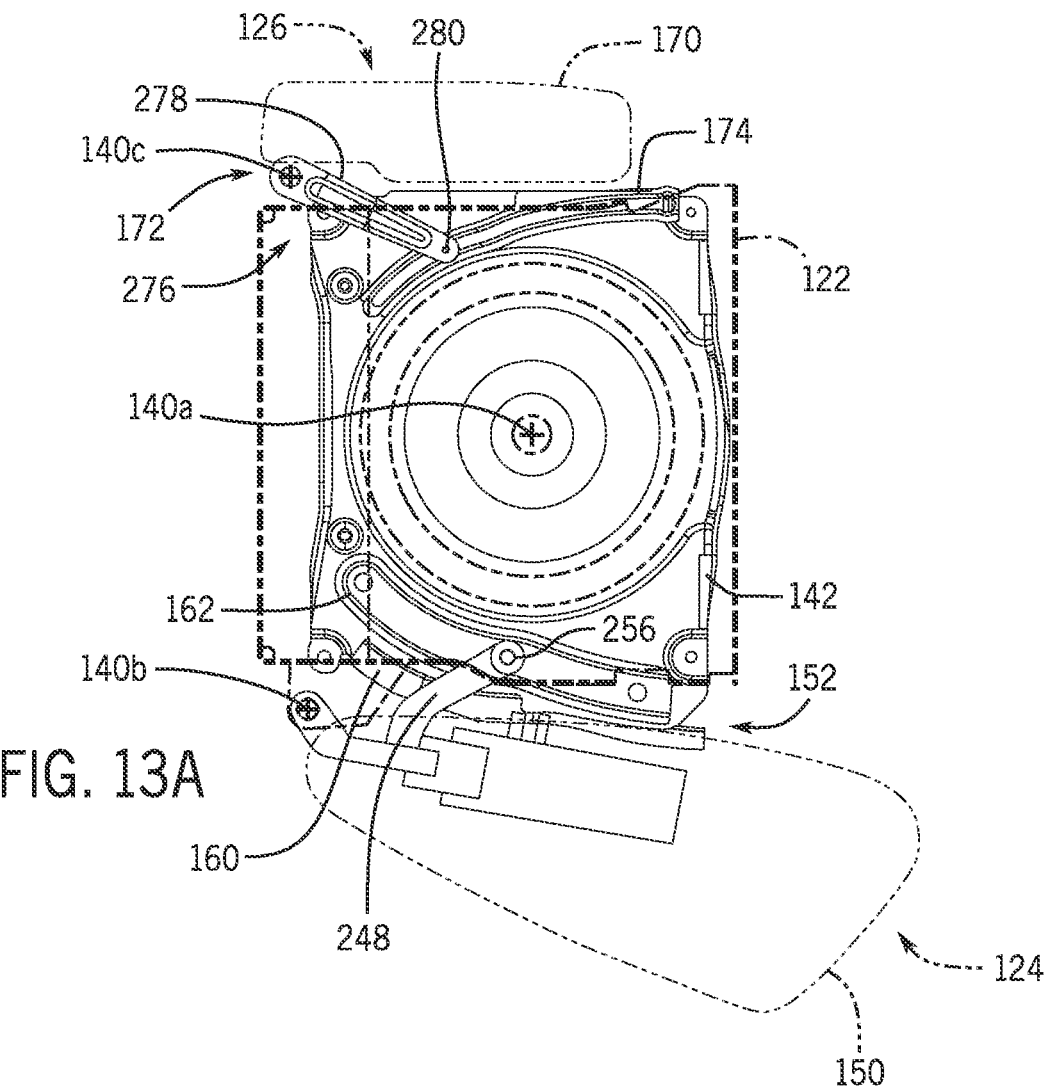
FIG. 13A is a schematic top view of the operator station of FIG. 3 in a neutral state.
FIG. 13B is a partial schematic first side view of the operator station of FIG. 3 in the neutral state.
Figure 14A:
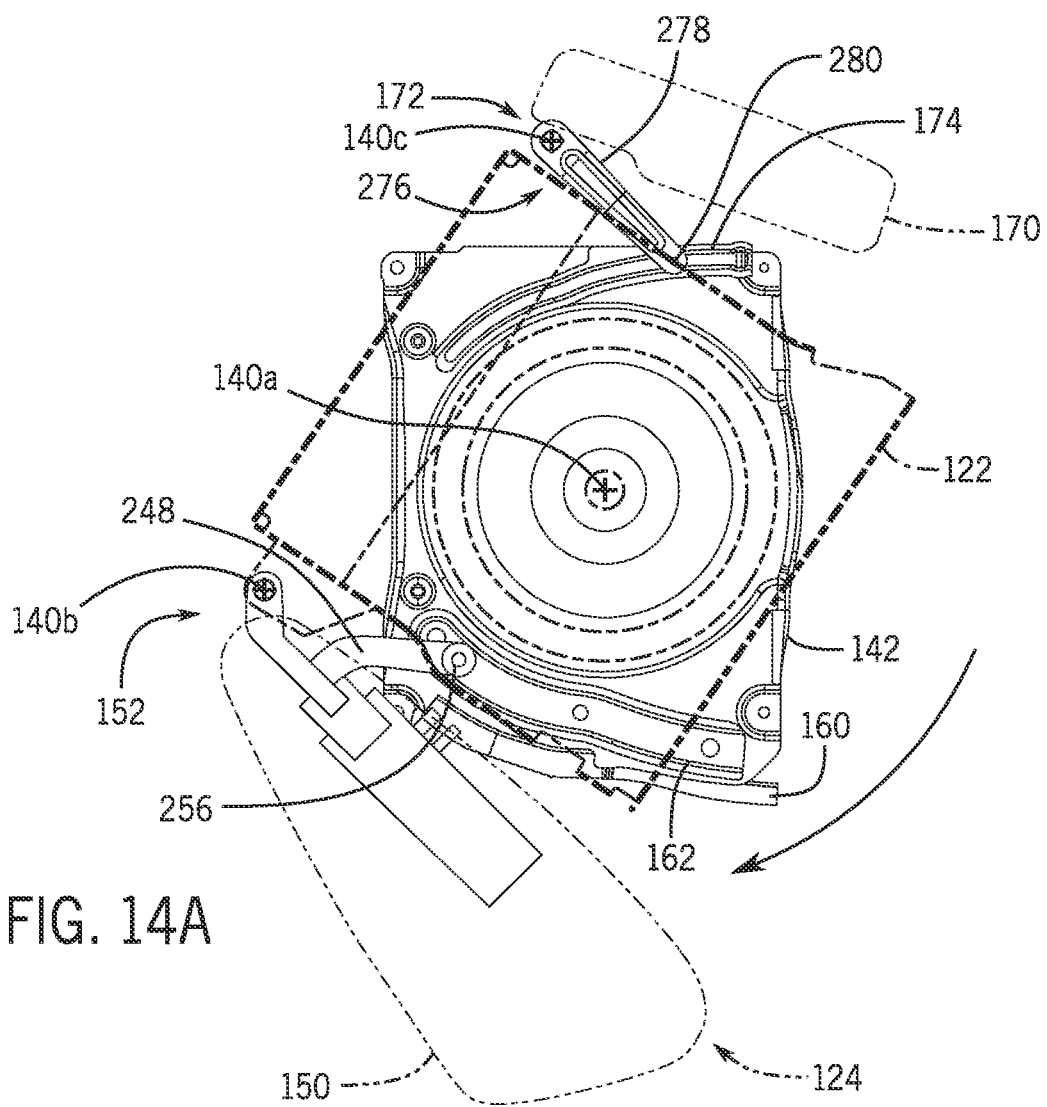
FIG. 14A is a schematic top view of the operator station of FIG. 3 in a clockwise state.
Figure 14B:
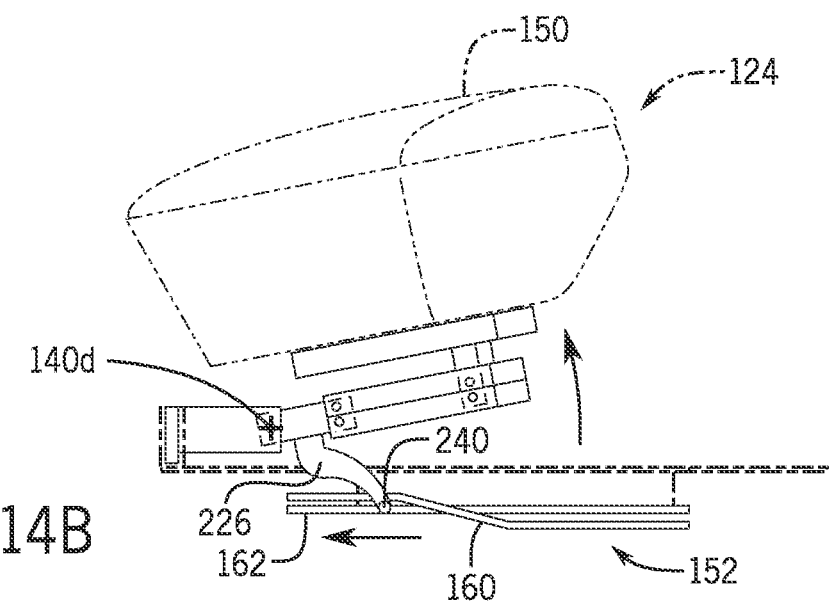
FIG. 14B is a partial schematic first side view of the operator station of FIG. 3 in the clockwise state.
Figure 15A:
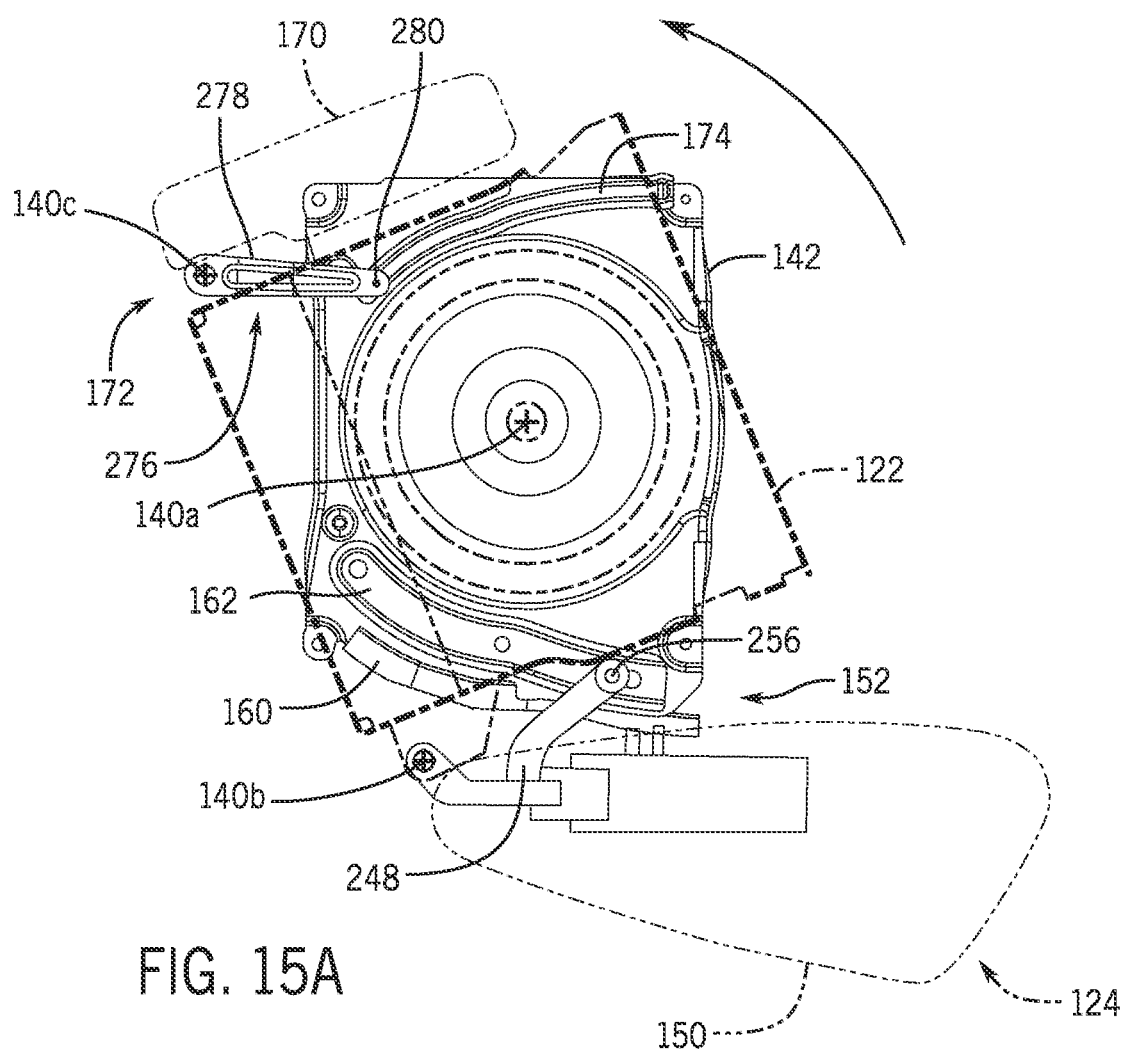
FIG. 15A is a schematic top view of the operator station of FIG. 3 in a counterclockwise state.
Figure 15B:
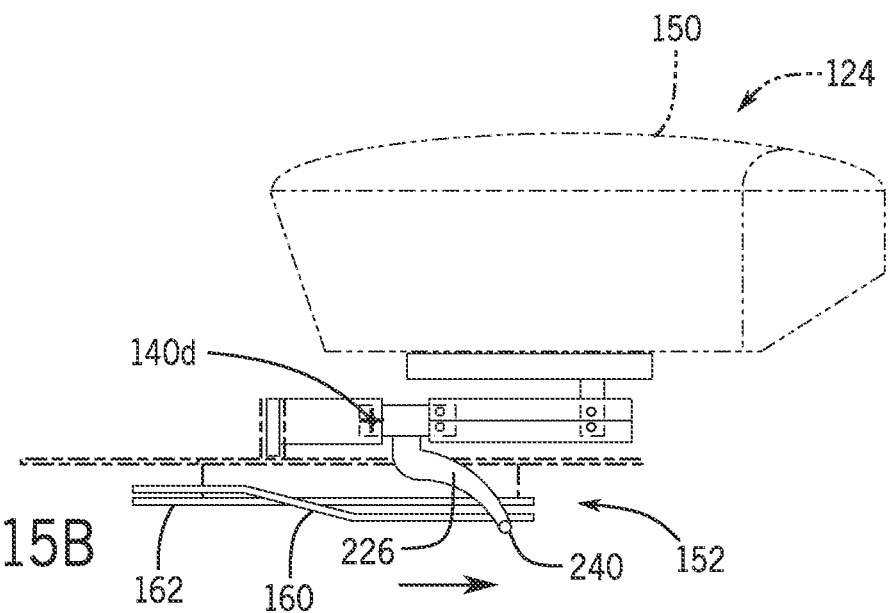
FIG. 15B is a partial schematic first side view of the operator station of FIG. 3 in the counterclockwise state.
Figure 16:
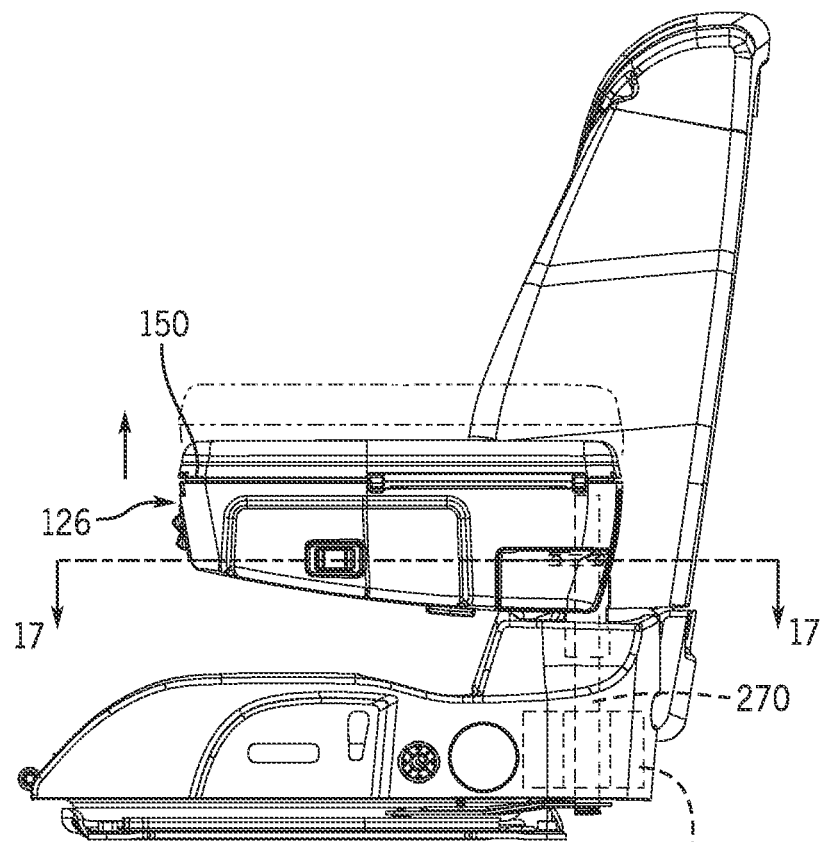
FIG. 16 is a further second side view of an operator station of FIG. 3.

The view of FIGS. 13A, 13B, 14A, 14B, 15A, and 15B are schematic top views (FIGS. 13A, 14A, 15A) and schematic side views (FIGS. 13B, 14B, 15B) of the operator station 110 in different horizontal swivel positions or states of the chair 122. In particular, the chair 122 of the operator station 110 may swivel from a neutral state (as shown in FIGS. 13A and 13B) into a clockwise direction for a clockwise state (as shown in FIGS. 14A and 14B) and/or into a counterclockwise direction for a counterclockwise state (as shown in FIGS. 15A and 15B). In FIGS. 13A, 13B, 14A, 14B, 15A, and 15B, various axes 140a, 140b, 140c, and 140d are labeled and discussed below. Generally, as an introduction, axis 140a is a swivel axis about which the chair 122 swivels relative to the base frame 142; axis 140b is a control arm horizontal pivot axis (coincident with the axis of the mounting post 260) about which the control arm body 150 pivots relative to chair frame 134 during at least a portion of the swiveling movement of the chair 122; axis 140c is an armrest horizontal pivot axis (coincident with the axis of the mounting post 270) about which the armrest body 170 pivots relative to chair frame 134 during at least a portion of the swiveling movement of the chair 122; and axis 140d (coincident with the axis of the bearing axle 238) is a control arm vertical pivot axis about which the control arm body 150 pivots during at least a portion of the swiveling movement of the chair 122. The various positions of the control arm 124 and armrest 126 during such swiveling movement is described below in greater detail with initial reference to FIGS. 13A and 13B referencing the neutral state.

As shown in FIG. 13B, the chair 122 is positioned such that the control arm vertical pivot adjustment cam 240 mounted to the control arm vertical adjustment apparatus coupling strut 226 on the seat frame 140 is located within a relatively center portion of the control arm vertical track 160. In this chair position and associated control arm vertical track portion, the control arm body 150 is at a first or level vertical pivot control arm-chair position relative to the chair 122, which generally results in the control arm body 150 being horizontal relative to the operator chair 122.

As shown in FIG. 13A, the operator chair 122 is positioned such that the control arm horizontal pivot adjustment cam 256 mounted to the control arm horizontal pivot adjustment member strut 248 on the seat frame 140 is located within a relatively center portion of the control arm horizontal track 162. In this chair position and associated control arm horizontal track portion, the control arm body 150 is at a first horizontal pivot control arm-chair position relative to the operator chair 122 and a first horizontal pivot control arm-base position relative to the base frame 142. As shown, the first horizontal pivot control arm-chair position of the control arm body 150 in the neutral state is generally parallel to the operator chair 122, and the first horizontal pivot control arm-base position of the control arm body 150 in the neutral state is generally parallel to the base frame 142.

As shown in FIG. 13A, the operator chair 122 is positioned such that the armrest horizontal pivot adjustment cam 280 mounted to the armrest horizontal pivot adjustment apparatus coupling strut 278 on the seat frame 140 is located within a relatively center portion of the armrest horizontal track 174. In this chair position and associated armrest horizontal track portion, the armrest body 170 is at a first horizontal pivot armrest-chair position relative to the operator chair 122 and a first horizontal pivot armrest-base position relative to the base frame 142. As shown, the first horizontal pivot armrest-chair position of the armrest body 170 is generally parallel to the operator chair 122 in the neutral state, and the first horizontal pivot armrest-base position of the armrest body 170 is generally parallel to the base frame 142 in the neutral state.

As noted above, the views of FIGS. 14A and 14B depict the interaction of the control arm 124 and armrest 126 relative to the chair 122 and/or the base frame 142 as the operator chair 122 horizontally swivels through a subset of angles that are in a clockwise direction relative to the neutral state (as clockwise states).

As shown in FIG. 14B, the operator chair 122 is positioned such that the control arm vertical pivot adjustment cam 240 mounted to the control arm vertical adjustment apparatus coupling strut 226 on the seat frame 140 is located within a relatively rearward portion of the control arm vertical track 160. In this chair position and associated control arm vertical track portion, the control arm body 150 is at a second vertical pivot control arm-chair position relative to the operator chair 122 in which the control arm body 150 is pivoted upwards. The upward pivoting movement of the control arm body 150 is a result of the upwardly extending portion of the control arm vertical track 160 that the control arm vertical pivot adjustment cam 240 follows as the chair 122 is swiveled within the clockwise states. The control arm body 150 pivots upright about a lateral axis substantially perpendicular to a swivel axis of the operator chair 122 as the operator chair 122 rotates about the swivel axis with respect to the base frame 142. As a result of this pivoting movement, the control arm body 150 may avoid interference of conflict with the first console 112 (FIG. 2).

As shown in FIG. 14A, the chair 122 is positioned such that the control arm horizontal pivot adjustment cam 256 mounted to the control arm horizontal pivot adjustment member strut 248 on the seat frame 140 is located within a relatively rearward portion of the control arm horizontal track 162. The shape of the control arm horizontal track 162 is such that the relatively rearward portion is radially consistent or constant relative to the centers of the base frame 142 and seat frame 140 (which in this example are coincident). As a result, during clockwise movement, the control arm horizontal pivot adjustment cam 256 follows the relatively rearward portion of the control arm horizontal track 162 such that the ends of the control arm horizontal pivot adjustment member strut 248 are held constant relative to one another to maintain the relative position of the control arm body 150 relative to the seat 122 as the entire operator chair 122 is pivoting relative to the base frame 142. In this chair position and associated control arm horizontal track location, the control arm body 150 is at a second horizontal pivot control arm-chair position relative to the operator chair 122 and a second horizontal pivot control arm-base position relative to the base frame 142. As shown, the second horizontal pivot control arm-chair position is similar or identical to the second horizontal pivot control arm-chair position. In other words, the control arm body 150 swivels with the chair 122, without pivoting relative to the chair 122. The second horizontal pivot control arm-base position relative to the base frame 142 is a result of the control arm body 150 pivoting with the overall operator chair 122 relative to the base frame 142. As the operator chair 122 swivels in the clockwise direction from the neutral state, the control arm body 150 continues to pivot with the operator chair 122. This may enable the control arm body 150 to maintain the position relative to the operator chair 122, typically selected by the operator for comfort, while moving the operator chair 122 in the clockwise direction.

As shown in FIG. 14A, the operator chair 122 is positioned such that the armrest horizontal pivot adjustment cam 280 mounted to the armrest horizontal pivot adjustment apparatus coupling strut 278 on the seat frame 140 is located within a relatively forward portion of the armrest horizontal track 174. The shape of the armrest horizontal track 174 is such that the relatively forward portion radially deviates away from the centers of the base frame 142 and seat frame 140. In other words, the forward portion of the armrest horizontal track 174 extends away from the base frame 142 and seat frame 140. As a result, although the armrest mounting post 270 is secured to the seat frame 140 and moves with the seat frame 140, the armrest horizontal pivot adjustment cam 280 follows the relatively forward portion of the armrest horizontal track 174 such that the ends of the armrest horizontal pivot adjustment apparatus coupling strut 278 are rotated relative to one another to pivot the armrest body 170 relative to the seat 136 as the entire operator chair 122 is swiveling relative to the base frame 142. In this chair position and associated armrest horizontal track location, the armrest body 170 is at a second horizontal pivot armrest-chair position relative to the seat 136 and a second horizontal pivot armrest-base position relative to the base frame 142. As shown, the second horizontal pivot armrest-chair position is the result of the armrest body 170 pivoting away from the seat 136. The second horizontal pivot armrest-base position relative to the base frame 142 is a result of the armrest body 170 pivoting closer to the base frame 142 as a result of the overall clockwise swiveling movement of the chair 122, but is also further away from the base frame 142 than would otherwise be the case relative to the neutral state as a result of the horizontal pivoting of the armrest body 170 relative to the seat 136. As the operator chair 122 moves in the clockwise direction from the neutral position, the armrest body 170 continues to pivot away from front portions of the seat 136. In effect, the armrest body 170 may be considered to pivot in a counterclockwise direction about axis 140c when the chair 122 swivels in the clockwise direction about the swivel axis 140a (and vice versa) within the clockwise states. The relative rotation of the armrest body 170 with respect to the chair 122 occurs during at least a subset of angles of relative rotation of the chair frame 134 with respect to the base frame 142. This may enable the armrest body 170 to avoid interference or contact with the steering wheel 120 (FIG. 2) when moving the operator chair 122 in the clockwise direction. Any suitable maximum angle between the armrest body 170 and the seat frame 140 may be provided when swiveling in the clockwise direction, such as approximately 30°.

As noted above, the views of FIGS. 15A and 15B depict the interaction of the control arm 124 and armrest 126 relative to the seat 136 and/or the base frame 142 as the operator chair 122 horizontally swivels in through a subset of angles that are in a counterclockwise direction relative to the neutral state (as counterclockwise states).

As shown in FIG. 15B, the operator chair 122 is positioned such that the control arm vertical pivot adjustment cam 240 mounted to the control arm vertical adjustment apparatus coupling strut 226 on the seat frame 140 is located within a relatively forward portion of the control arm vertical track 160. In this chair position and associated control arm vertical track portion, the control arm body 150 is at a third vertical pivot control arm-chair position relative to the seat 136, which generally horizontal relative to the seat 136. The third vertical pivot control arm-chair position is the same as the first vertical pivot control arm-chair position depicted in FIG. 13A, which is a result of the track 160 having center and forward portions being level with one another.

As shown in FIG. 15A, the operator chair 122 is positioned such that the control arm horizontal pivot adjustment cam 256 mounted to the control arm horizontal pivot adjustment member strut 248 on the seat frame 140 is located within a relatively forward portion of the control arm horizontal track 162. The shape of the control arm horizontal track 162 is such that the relatively forward portion radially deviates away from the centers of the base frame 142 and seat frame 140. In other words, the forward portion of the control arm horizontal track 162 extends away from the base frame 142 and seat frame 140. As a result, although the control arm mounting post 260 is secured to the seat frame 140 and moves with the seat 136, the control arm horizontal pivot adjustment cam 256 follows the relatively forward portion of the control arm horizontal track 162 such that the ends of the control arm horizontal pivot adjustment member strut 248 are rotated relative to one another to pivot the control arm body 150 relative to the seat 136 as the entire operator chair 122 is swiveling relative to the base frame 142. In this chair position and associated control arm horizontal track location, the control arm body 150 is at a third horizontal pivot control arm-chair position relative to the seat 136 and a third horizontal pivot control arm-base position relative to the base frame 142. As shown, the third horizontal pivot control arm-chair position is the result of the control arm body 150 pivoting away from the seat 136. The third horizontal pivot control arm-base position relative to the base frame 142 is a result of the control arm body 150 pivoting closer to the base frame 142 during the overall counterclockwise movement of the operator chair 122, but is also further away from the base frame 142 than would otherwise be the case relative to the neutral state as a result of the horizontal pivoting of the control arm body 150 relative to the seat 136. As the operator chair 122 moves in the counterclockwise direction from the neutral state, the control arm body 150 continues to pivot away from front portions of the seat 136. In effect, the control arm body 150 may be considered to pivot in a clockwise direction about axis 140b when the chair 122 swivels in the counterclockwise direction about the swivel axis 140a (and vice versa) within the counterclockwise states. The relative rotation of the control arm body 150 with respect to the chair 122 occurs during at least a subset of angles of relative rotation of the chair frame 134 with respect to the base frame 142. This may enable the control arm 124 to avoid interference or contact with the steering wheel 120 (FIG. 2) when moving the operator chair 122 in the counterclockwise direction. Any suitable maximum angle between the control arm body 150 and the seat frame 140 may be provided when swiveling in the counterclockwise direction, such as approximately 30°.

As shown in FIG. 15A, the operator chair 122 is positioned such that the armrest horizontal pivot adjustment cam 280 mounted to the armrest horizontal pivot adjustment apparatus coupling strut 278 on the seat frame 140 is located within a relatively rearward portion of the armrest horizontal track 174. The shape of the armrest horizontal track 174 is such that the relatively rearward portion is radially consistent or constant relative to the centers of the base frame 142 and seat frame 140. As a result, during counterclockwise movement, the armrest horizontal pivot adjustment cam 280 follows the relatively rearward portion of the armrest horizontal track 174 such that the ends of the armrest horizontal pivot adjustment apparatus coupling strut 278 are held constant relative to one another to maintain the relative position of the armrest body 170 relative to the seat 136 as the entire operator chair 122 is pivoting relative to the base frame 142. In this chair position and associated armrest horizontal track location, the armrest body 170 is at a third horizontal armrest-chair position relative to the chair 122 and a third horizontal armrest-base position relative to the base frame 142. As shown, the third horizontal armrest-chair position is similar or identical to the first horizontal armrest-chair position. The third horizontal armrest-base position relative to the base frame 142 is a result of the armrest body 170 swiveling with the overall operator chair 122 relative to the base frame 142. As the operator chair 122 moves in the counterclockwise direction from the neutral state, the armrest body 170 continues to swivel with the seat 136. This may enable the armrest body 170 to maintain the position relative to the seat 136, typically selected by the operator for comfort, while moving the operator chair 122 in the counterclockwise direction.

As depicted in FIGS. 13A, 13B, 14A, 14B, 15A, and 15B, operator station 110 provides a cooperating system of seat 136, frames 134, 142, and chair arms 124, 126 in which the chair arms 124, 126 may simultaneously pivot about multiple axes, at times, during the same or different subsets of swivel positions of the chair 122.

For example, during movement in a clockwise direction from the neutral state through a clockwise state (e.g., FIGS. 13A and 13B to FIGS. 14A and 14B), the armrest body 170 pivots about axis 140c relative to the chair frame 134, e.g., outwardly from the chair frame 134, while swiveling with the chair 122. In this same condition, the control arm body 150 is pivoted upwards in a vertical plane relative to the chair frame 134 and is stationary in a lateral plane relative to the chair frame 134 while swiveling with the chair 122. Moreover, during movement in a counterclockwise direction from and through the clockwise state to the neutral state (e.g., FIGS. 14A and 14B back to FIGS. 13A and 13B), the armrest body 170 also pivots about axis 140c relative to the chair frame 134, e.g., inwardly to the chair frame 134, while swiveling with the chair 122. In this same condition, the control arm body 150 is pivoted downwards in the vertical plane relative to the chair frame 134 and is stationary relative in the lateral plane to the chair frame 134 while swiveling with the chair 122.

In contrast, during movement in a counterclockwise direction from the neutral state through a counterclockwise state (e.g., FIGS. 13A and 13B to FIGS. 15A and 15B), the control arm body 150 pivots horizontally in a lateral plane about axis 140b relative to the chair frame 134, e.g., outwardly from the chair frame 134, and remains stationary in a vertical plane relative to the chair frame 134, each while swiveling with the chair 122. Further in these conditions, the armrest body 170 is stationary relative to the chair frame 134 while swiveling with the chair. Moreover, during movement in a clockwise direction from and through the counterclockwise state to the neutral state (e.g., FIGS. 15A and 15B back to FIGS. 13A and 13B), the control arm body 150 also horizontally pivots in a lateral plane about axis 140b relative to the chair frame 134, e.g., inwardly to the chair frame 134, and is stationary in a vertical plane relative to the chair frame 134, each while swiveling with the chair 122.

As such, the chair arms 124, 126 may simultaneously pivot about multiple axes, at times, during the same or different subsets of swivel positions of the chair 122. In particular, the control arm body 150 pivots in a lateral plane only when the chair 122 is in a counterclockwise position or angle, and while the direction that the control arm body 150 is pivoting is dependent on the swivel direction, the pivoting occurs in each swivel direction in these positions. Moreover, the control arm body 150 pivots in a vertical plane only when the chair 122 is in a clockwise position or angle, and while the direction that the control arm body 150 is pivoting is dependent on the swivel direction, the pivoting occurs in each swivel direction in these positions. The manner in which the control arm body 150 pivots in the vertical plane in dependence on the swivel position may vary and be defined by the shape of the control arm vertical track 160. For example, the control arm vertical track 160 may have an upwards slope at initial clockwise position swivel angles and level off at greater clockwise position swivel angles, thereby resulting in a pivoting movement when moving in the clockwise swivel direction such that the control arm body 150 initially begins to pivot up at relatively small angles from the neutral position, then reaches a maximum pivot position at an angle at which the control arm body 150 otherwise would contact the side console 112 to clear the side console 112, and at further angles, the control arm body 150 may be maintained at such a pivot position. Similarly, the armrest body 170 pivots only when the chair 122 is in a clockwise position or angle, and while the direction that the armrest body 170 is pivoting is dependent on the swivel direction, the pivoting occurs in each swivel direction in these positions. Collectively, this enables a cooperating arrangement in which the arms 124, 126 pivot and move to avoid conflict with consoles 112, 114, 118 within the cab 102. For example, in clockwise positions, the control arm 124 may avoid the first console 112 (and associated monitor 116) by pivoting upwards and the armrest 126 may avoid the forward console 118 (and associated steering wheel 120) by pivoting outwards; and in counterclockwise positions, the control arm 124 may avoid the forward console 112 (and associated monitor 116) by pivoting outwards. This enables more interfaces and/or controls on the consoles 112, 114, 118; a fuller and/or larger control arm body 150 and/or armrest body 170; and/or more potential arm and/or interface position selections for operator comfort.

Figure 17:
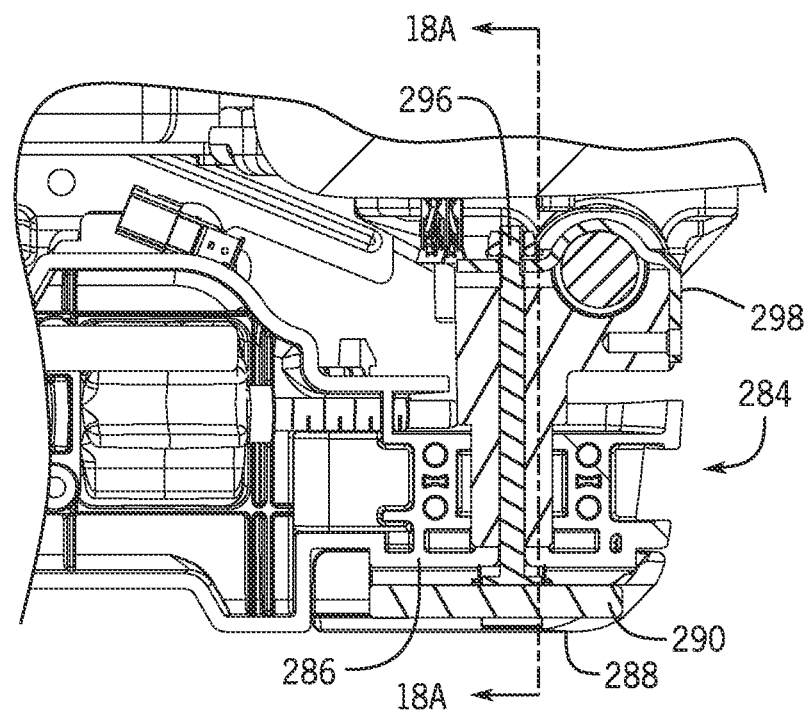
FIG. 17 is a partial cross-sectional view through line 17-17 of FIG. 16.

The views of FIGS. 16-19 provide additional details regarding the vertical lift function of the armrest 126. In one embodiment, the armrest 126 may be considered to include a vertical adjustment apparatus 284 that enables the repositioning of the armrest body 170 along the armrest mounting post 270. In particular, the vertical adjustment apparatus 284 may implements a clamped state in which the armrest body 170 is secured and an unclamped state in which the armrest body 170 may be repositioned. For example, and particularly referring to FIG. 16, the armrest body 170 may be repositioned from a relatively low position (depicted in solid lines in FIG. 16) to a relatively high position (depicted in dashed lines in FIG. 16), as well as intermediate vertical positions, in the unclamped state. Further details of the vertical adjustment apparatus 284 are depicted in FIG. 17, which a partial cross-sectional view of the armrest body 170 through line 17-17 of FIG. 16.

Referring to FIG. 17, the vertical adjustment apparatus 284 includes a vertical adjustment apparatus base 286 within the interior of the armrest body 170. A lever 288 is mounted to the vertical adjustment apparatus base 286 with a lever axle 290. In particular, a lever cylinder 292 surrounds the lever axle 290 to support the lever 288 on the lever axle 290 relative to the vertical adjustment apparatus base 286. As described below, the lever 288 may pivot on the lever axle 290 such that a lever cylinder eccentric surface 294 selectively abuts or otherwise engages the vertical adjustment apparatus base 286. The vertical adjustment apparatus 284 further includes a tie rod 296 with a first end secured to the lever axle 290 and a second end secured to a clamp 298. As described in greater detail below, the tie rod 296 may be considered to be axially repositionable based on the position of the lever 288. The clamp 298 is fixed at a first end to the apparatus base 286, extends around the armrest mounting post 270, and is secured to the tie rod 296 at a second end.

Figure 18A:
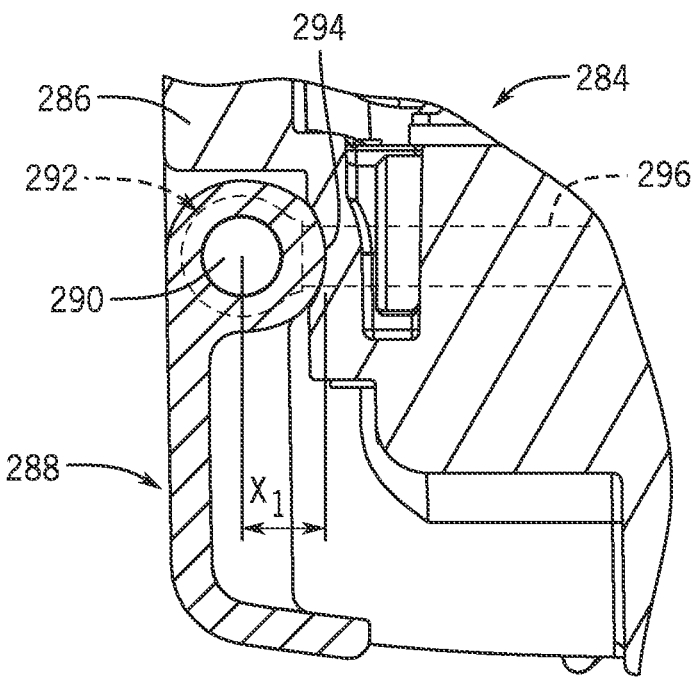
FIG. 18A is a partial cross-sectional view through line 18A-18A of FIG. 17 with an armrest vertical lift adjustment apparatus in a clamped state.
Figure 18B:
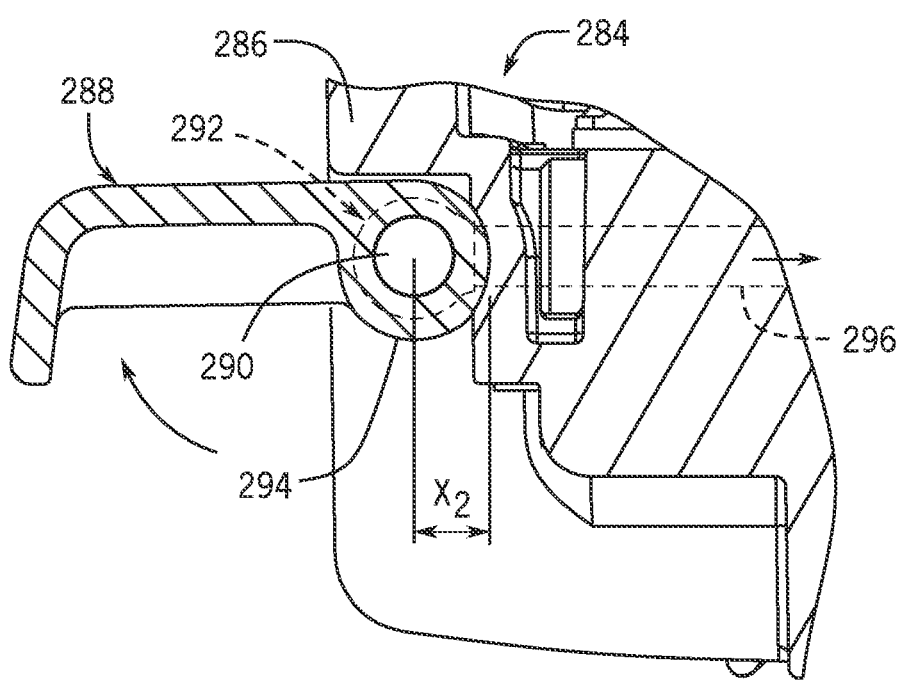
FIG. 18B is a partial cross-sectional view corresponding to FIG. 18A with the armrest vertical lift adjustment apparatus in an unclamped state.
Figure 19A:
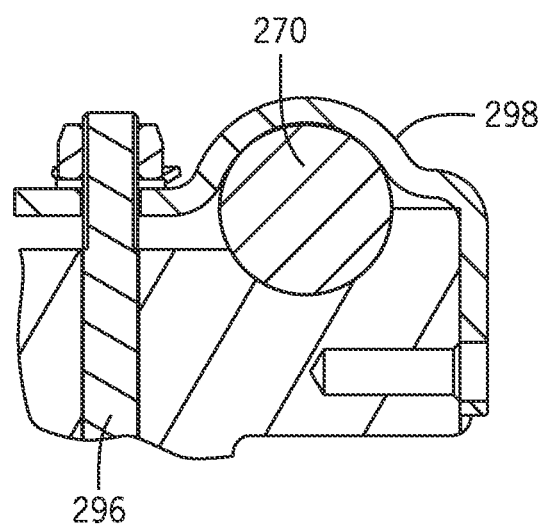
FIG. 19A is a partial cross-sectional view through line 18A-18A with the armrest vertical lift adjustment apparatus in the clamped state.
Figure 19B:
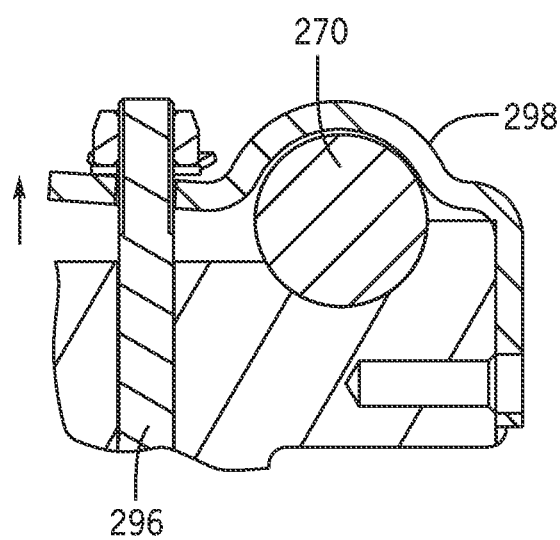
FIG. 19B is a partial cross-sectional view corresponding to FIG. 19A of the armrest vertical lift adjustment apparatus in the unclamped state.

The views of FIGS. 18A and 19A depict each end of the tie rod 296 in the clamped state. In the clamped state, the lever 288 is positioned to pull the tie rod 296 and therefore the surface of clamp 298 into a secure friction engagement with the surface of armrest mounting post 270. In this clamped state, the armrest body 170 is stationary or reasonably unmovable relative to the armrest mounting post 270 and thus relative to the chair seat 136. The views of FIGS. 18B and 19B depict each end of the tie rod 296 in the unclamped state in which the tie rod 296 is free to move towards the clamp 298, thereby releasing the secure friction engagement between the clamp 298 and the armrest mounting post 270. In this unclamped state, the armrest body 170 may be manually repositioned up or down the armrest mounting post 270 such that the armrest body 170 may be repositioned by the operator.

The vertical adjustment apparatus 284 may be placed in the clamped state or the unclamped state based on the position of the lever 288. In particular, and as shown in FIG. 18A, the lever 288 is "closed" or generally vertical (or flush) relative to armrest body 170. In this position of the lever 288, the eccentric surface 294 of the lever cylinder 292 surrounding the lever axle 290 and connected to the tie rod 296 is pressed against the vertical adjustment apparatus base 286, thereby pushing the lever axle 290 away from the vertical adjustment apparatus base 286, which in turn pulls the end of the tie rod 296 in an outward direction. In other words, the distance ($X_1$) between the center of the lever axle 290 and the outer surface of the eccentric surface 294 abutting the vertical adjustment apparatus base 286 is such the tie rod 296 secures the clamp 298 against the armrest mounting post 270, as shown in FIG. 19A.

In contrast, and as shown in FIG. 18B, the lever 288 is "open" or generally horizontal relative to armrest body 170. In this position of the lever 288, the lever cylinder eccentric surface 294 of the lever cylinder 292 is no longer abutting the vertical adjustment apparatus base 286, thereby enabling movement of the lever axle 290 relatively closer to the vertical adjustment apparatus base 286, which in turn releases the end of the tie rod 296 into an inward direction. In other words, the distance ($X_2$) between the center of the lever axle 290 and the outer surface of the lever cylinder 292 in a circumferential location other than the lever cylinder eccentric surface 294 that abuts the vertical adjustment apparatus base 286 positions the tie rod 296 to release the tension of the clamp 298 against the armrest mounting post 270, as shown in FIG. 19B. In effect, the eccentric surface 294 provides a cam force between the lever 288 and the tie rod 296 to secure the clamp 298 in the clamped state such that the armrest body 170 is at least in part fixed to the mounting post 270 and releases the cam force between the lever 288 and tie rod 296 to release or disengage the surface of the clamp 298 relative to the surface of the mounting post 270 in the unclamped state is repositionable along the mounting post 270.

Accordingly, the present disclosure provides a mechanism for adjusting an operator station, particularly relative to the various consoles within a work vehicle.

Also, the following examples are provided, which are numbered for easier reference.

1. An operator station for a cab of a work vehicle, the operator station comprising: a base frame configured to be secured to a floor of the cab; an operator chair including a chair frame mounted on the base frame; and a chair arm positioned on a first side of the chair frame, the chair arm including: a chair arm body; and a chair arm adjustment mechanism including: a mounting post coupled to the chair arm and the chair frame, extending along an upright post axis, and having an exterior post surface; a clamp configured to fit about the mounting post so that a clamp surface of the clamp is engageable with the post surface of the mounting post; a tie rod coupled to the clamp; and a lever pivotally coupled to the tie rod to axially reposition the tie rod, one or more of the lever and the tie rod having an eccentric surface configured to apply a cam force between the lever and the tie rod; wherein the lever is movable into a first pivotal position to move the tie rod into a first axial position along its long axis and substantially disengage the clamp surface from the post surface, and the lever is movable into a second pivotal position to move the tie rod into a second axial position along its long axis and substantially engage the clamp surface on the post surface; and wherein, when the clamp surface is disengaged from the post surface, the chair arm body is movable along the post axis, and when the clamp surface is engaged with the post surface, the chair arm body, at least in part, is fixed along the post axis.

2. The operator station of example 1, wherein the eccentric surface is integral with or coupled to the lever.

3. The operator station of example 2, wherein the eccentric surface is configured to abut the chair arm body in the second pivotal position of the lever to pull the tie rod with the cam force and configured to disengage the chair arm body in the first pivotal position of the lever to release the tie rod relative to the cam force.

4. The operator station of example 1, wherein the chair arm body has a first lateral side facing away from the operator chair, the lever being positioned on the first lateral side.

5. The operator station of example 4, wherein the lever is flush with the first lateral side of the chair arm body when in the second pivotal position.

6. The operator station of example 1, wherein the tie rod extends laterally through the chair arm body.

7. The operator station of example 1, wherein the tie rod is positioned entirely within the chair arm body.

8. The operator station of example 1, wherein the lever is configured to pivot about a lever axis that is parallel to a longitudinal axis of the chair arm.

9. The operator station of example 1, wherein the clamp of the chair arm adjustment mechanism is in between the chair arm body and the operator chair.

10. The operator station of example 1, wherein the clamp has a first end secured to the chair arm body and wraps around the mounting post to a second end secured to the tie rod.

11. The operator station of example 1, wherein the chair arm is further configured to pivot in a lateral plane that is perpendicular to the post axis.

12. The operator station of example 11, wherein the chair arm adjustment mechanism includes a coupling strut having a first end coupled to the mounting post and a second end coupled to a cam that engages a track to pivot the mounting post and the chair arm within the lateral plane.

13. An operator system in a cab of a work vehicle comprising: at least one work vehicle console; and an operator station for the cab of the work vehicle, the operator station including: a base frame configured to be secured to a floor of the cab; an operator chair including a chair frame mounted on the base frame; and a chair arm positioned on a first side of the chair frame, the chair arm including: a chair arm body; and a chair arm adjustment mechanism including: a mounting post coupled to the chair arm and the chair frame, extending along an upright post axis, and having an exterior post surface; a clamp configured to fit about the mounting post so that a clamp surface of the clamp is engageable with the post surface of the mounting post; a tie rod coupled to the clamp; and a lever pivotally coupled to the tie rod to axially reposition the tie rod, one or more of the lever and the tie rod having an eccentric surface configured to apply a cam force between the lever and the tie rod; wherein the lever is movable into a first pivotal position to move the tie rod into a first axial position along its long axis and substantially disengage the clamp surface from the post surface, and the lever is movable into a second pivotal position to move the tie rod into a second axial position along its long axis and substantially engage the clamp surface on the post surface; and wherein, when the clamp surface is disengaged from the post surface, the chair arm body is movable along the post axis and relative to the at least one work vehicle console, and when the clamp surface is engaged with the post surface, the chair arm body, at least in part, is fixed along the post axis.

14. The operator system of example 13, wherein the eccentric surface is integral with or coupled to the lever.

15. The operator system of example 14, wherein the eccentric surface is configured to abut the chair arm body in the second pivotal position of the lever to pull the tie rod with the cam force and configured to disengage the chair arm body in the first pivotal position of the lever to release the tie rod relative to the cam force.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of any claims.

What is claimed is:

1. An operator station for a cab of a work vehicle, the operator station comprising:
    a base frame configured to be secured to a floor of the cab;
    an operator chair including a chair frame mounted on the base frame; and
    a chair arm positioned on a first side of the chair frame, the chair arm including:
        a chair arm body; and
        a chair arm adjustment mechanism including:
            a mounting post coupled to the chair arm and the chair frame, extending along an upright post axis, and having an exterior post surface;
            a clamp configured to fit about the mounting post so that a clamp surface of the clamp is engageable with the post surface of the mounting post;
            a tie rod coupled to the clamp; and
            a lever pivotally coupled to the tie rod to axially reposition the tie rod, one or more of the lever and the tie rod having an eccentric surface configured to apply a cam force between the lever and the tie rod;
    wherein the lever is movable into a first pivotal position to move the tie rod into a first axial position along its long axis and substantially disengage the clamp surface from the post surface, and the lever is movable into a second pivotal position to move the tie rod into a second axial position along its long axis and substantially engage the clamp surface on the post surface;
    wherein, when the clamp surface is disengaged from the post surface, the chair arm body is movable along the post axis, and when the clamp surface is engaged with the post surface, the chair arm body, at least in part, is fixed along the post axis; and
    wherein the clamp has a first end secured to the chair arm body and wraps around the mounting post to a second end secured to the tie rod.

2. The operator station of claim 1, wherein the eccentric surface is integral with or coupled to the lever.

3. The operator station of claim 2, wherein the eccentric surface is configured to abut the chair arm body in the second pivotal position of the lever to pull the tie rod with the cam force and configured to disengage the chair arm body in the first pivotal position of the lever to release the tie rod relative to the cam force.

4. The operator station of claim 1, wherein the chair arm body has a first lateral side facing away from the operator chair, the lever being positioned on the first lateral side.

5. The operator station of claim 4, wherein the lever is flush with the first lateral side of the chair arm body when in the second pivotal position.

6. The operator station of claim 1, wherein the tie rod extends laterally through the chair arm body.

7. The operator station of claim 1, wherein the tie rod is positioned entirely within the chair arm body.

8. The operator station of claim 1, wherein the lever is configured to pivot about a lever axis that is parallel to a longitudinal axis of the chair arm.

9. The operator station of claim 1, wherein the clamp of the chair arm adjustment mechanism is in between the chair arm body and the operator chair.

10. The operator station of claim 1, wherein the chair arm is further configured to pivot in a lateral plane that is perpendicular to the post axis.

11. The operator station of claim 10, wherein the chair arm adjustment mechanism includes a coupling strut having a first end coupled to the mounting post and a second end coupled to a cam that engages a track to pivot the mounting post and the chair arm within the lateral plane.

12. An operator system in a cab of a work vehicle comprising:
at least one work vehicle console; and
an operator station for the cab of the work vehicle, the operator station including:
a base frame configured to be secured to a floor of the cab;
an operator chair including a chair frame mounted on the base frame; and
a chair arm positioned on a first side of the chair frame, the chair arm including:
a chair arm body; and
a chair arm adjustment mechanism including:
a mounting post coupled to the chair arm and the chair frame, extending along an upright post axis, and having an exterior post surface;
a clamp configured to fit about the mounting post so that a clamp surface of the clamp is engageable with the post surface of the mounting post;
a tie rod coupled to the clamp; and
a lever pivotally coupled to the tie rod to axially reposition the tie rod, one or more of the lever and the tie rod having an eccentric surface configured to apply a cam force between the lever and the tie rod;
wherein the lever is movable into a first pivotal position to move the tie rod into a first axial position along its long axis and substantially disengage the clamp surface from the post surface, and the lever is movable into a second pivotal position to move the tie rod into a second axial position along its long axis and substantially engage the clamp surface on the post surface;
wherein, when the clamp surface is disengaged from the post surface, the chair arm body is movable along the post axis and relative to the at least one work vehicle console, and when the clamp surface is engaged with the post surface, the chair arm body, at least in part, is fixed along the post axis; and
wherein the clamp has a first end secured to the chair arm body and wraps around the mounting post to a second end secured to the tie rod.

13. The operator system of claim 12, wherein the eccentric surface is integral with or coupled to the lever.

14. The operator system of claim 13, wherein the eccentric surface is configured to abut the chair arm body in the second pivotal position of the lever to pull the tie rod with the cam force and configured to disengage the chair arm body in the first pivotal position of the lever to release the tie rod relative to the cam force.

15. The operator system of claim 12, wherein the chair arm body has a first lateral side facing away from the operator chair, the lever being positioned on the first lateral side.

16. The operator system of claim 15, wherein the lever is flush with the first lateral side of the chair arm body when in the second pivotal position.

17. The operator system of claim 12,
wherein the lever is configured to pivot about a lever axis that is parallel to a longitudinal axis of the chair arm; and
wherein the clamp of the chair arm adjustment mechanism is in between the chair arm body and the operator chair.

18. The operator system of claim 12, wherein the chair arm is further configured to pivot in a lateral plane that is perpendicular to the post axis.

19. The operator system of claim 18, wherein the chair arm adjustment mechanism includes a coupling strut having a first end coupled to the mounting post and a second end coupled to a cam that engages a track to pivot the mounting post and the chair arm within the lateral plane.

* * * * *